United States Patent
Maeda et al.

(10) Patent No.: US 9,081,459 B2
(45) Date of Patent: Jul. 14, 2015

(54) TOUCH PANEL AND DISPLAY DEVICE PROVIDED WITH SAME

(75) Inventors: Kazuhiro Maeda, Osaka (JP); Yousuke Nakagawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 114 days.

(21) Appl. No.: 14/110,760

(22) PCT Filed: Apr. 9, 2012

(86) PCT No.: PCT/JP2012/059726
§ 371 (c)(1),
(2), (4) Date: Oct. 9, 2013

(87) PCT Pub. No.: WO2012/141147
PCT Pub. Date: Oct. 18, 2012

(65) Prior Publication Data
US 2014/0028625 A1    Jan. 30, 2014

(30) Foreign Application Priority Data

Apr. 13, 2011 (JP) ................................. 2011-089461

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC .................. G06F 3/044; G06F 3/0416; G06F 2203/04111; G06F 3/0412; G09G 2300/0426
USPC ...................... 345/173, 174; 178/18.03, 18.06
See application file for complete search history.

(56) References Cited

U.S. PATENT DOCUMENTS

| | | |
|---|---|---|
| 2008/0266273 A1 | 10/2008 | Slobodin et al. |
| 2009/0315854 A1 | 12/2009 | Matsuo |
| 2010/0045613 A1 | 2/2010 | Wu et al. |
| 2010/0066692 A1 | 3/2010 | Noguchi et al. |
| 2011/0095991 A1 | 4/2011 | Philipp et al. |

FOREIGN PATENT DOCUMENTS

JP        2010-72743 A    4/2010

OTHER PUBLICATIONS

U.S. Appl. No. 14/110,766, filed Oct. 9, 2013.

*Primary Examiner* — Koosha Sharifi-Tafreshi
(74) *Attorney, Agent, or Firm* — Chen Yoshimura LLP

(57) ABSTRACT

The touch panel of the present invention is a touch panel (1) that applies drive signals to drive electrodes (2) and carries out detection on the basis of the variation in the amount of charge that has been induced on detection electrodes (3), and is configured such that when drive signals are being applied to the drive electrodes, complementary signals having a different phase from the drive signals are applied to complementary electrodes (4), and the complimentary electrodes (4) are configured such that the amplitude ($\Delta Vcm$) of the complimentary signals satisfies the following formula:

$$\Delta Vcm = -\Delta Vdr \times (Cfo + Ccr)/Ccm.$$

9 Claims, 18 Drawing Sheets

(a)

(b)

(a) A-A'

(b) B-B'

(c) C-C'

(a)

2: Driver Electrode
3: Detection Electrode (b) A-A'

(c) B-B'

(d) C-C'

(a)

(b)

(a) A-A'

(b) B-B'

(c) C-C'

(a)

(b)

(a) A-A'

(b) B-B'

(a)

$Vout = -(Rf/Ri) \times Vin$ (b)

(a)

(b)

TOUCH PANEL AND DISPLAY DEVICE PROVIDED WITH SAME

TECHNICAL FIELD

The present invention relates to a touch panel that detects contact or approach of a finger, a stylus, or the like to a detection surface, and to a display device having such a touch panel function in the display part thereof.

BACKGROUND ART

A touch panel that detects that a finger, a stylus, or the like of a user has come into contact with or approached a detection surface is known. In recent years, electronic devices in which touch panel functions (also referred to as touch sensor functions) that can freely perform various functions just by having a stylus or the like touch the display screen are provided in a liquid crystal display element such as a liquid crystal display screen are starting to become widely used. Such a touch panel is formed onto a display panel, and by displaying various types of buttons on the display screen as images, it is possible to realize data input substituting these displayed buttons for normal buttons. Thus, when applying such a touch panel to a miniature mobile device, it is possible to have the display and buttons share a common space, thus presenting great advantages such as being able to increase the size of the display screen, decreasing the amount of space dedicated to control parts, or reducing the number of parts.

Additionally, a technique is known in which a touch panel shares some of the structure of the display part. For example, a configuration is known in which pixel electrodes or an opposite electrode for liquid crystal display, or the source bus lines double as one of the detection electrodes (detection lines) of a capacitance detection type touch panel. If the configuration is shared in this manner, it is also possible to attain the advantage that the device can be made thin.

However, if the detection electrode doubles as an electrode for display in this manner, the display driving frequency and the detection driving frequency match due to functional reasons. As a result, even if an attempt is made to raise the detection driving frequency because the detection speed is low and the responsiveness to data input is bad, there is a problem that it is not possible to freely change the detection driving frequency due to restrictions in the display driving frequency.

Patent Document 1 discloses a contact detection device in which the detection speed is improved without raising the detection driving frequency. As shown in FIG. 19, in Patent Document 1, the touch panel 110 has a contact response part that includes driver electrodes E1 and detection electrodes E2, which respond to contact and cause an electrical change, and a contact driver scanning part 111. The contact driver scanning part 111 scans a detection surface 113A in one direction by applying drive voltage to the driver electrodes E1, and controls output of the electric change from the detection electrodes E2 in chronological order. At this time, the contact driver scanning part 111 performs a plurality of scans (Re1 and Re2) in parallel for a drive signal source S and a reversed drive signal source Sx for different regions in the touch panel 110. With this configuration, the detection speed is improved without raising the frequency for contact detection.

Also, as shown in FIG. 20, in Patent Document 1, the contact driver scanning part performs parallel scanning to two different regions in the contact response part and supplies drive voltages having phases that are 180° apart in phase with respect to each other to the two regions, the contact driver scanning part controlling the output of electric change in chronological order by performing scanning in one direction on the detection surface by applying drive voltages to the contact response part, which causes electrical change in response to an object to be detected coming into contact or approaching the detection surface.

RELATED ART DOCUMENT

Patent Document

Patent Document 1: Japanese Patent Application Laid-Open Publication, "Japanese Patent Application Laid-Open Publication No. 2010-72743 (Published on Apr. 2, 2010)"

SUMMARY OF THE INVENTION

Problems to be Solved by the Invention

However, with the configuration of Patent Document 1, if objects to be detected come into contact with (approach) the same line in different contact response part regions, the electrical changes generated in the respective regions cancel each other out, resulting in no output.

In order to avoid this situation, a possible solution is to rely on instantaneous output change resulting from a time difference between the two contact (approach) points. However, this only works when the contact speed (i.e. the time difference) is sufficiently slower than the sensing speed, and if active sensing speed is slow (30 ms to a second, for example) such as when multiple unit output changes accumulate and are used as main output, when reactivating after standby, or the like, then there is a possibility of glitches such as non-detection occurring.

Means for Solving the Problems

The present invention takes into account the above-mentioned problems, and an object thereof is to provide a highly reliable touch panel in which glitches such as non-detection do not occur, and a display device provided therewith.

The inventors of the present invention have found that the above-mentioned object can be attained by mitigating the induction of an inactive charge among parasitic capacitance formed between the driver electrodes and the detection electrodes.

Thus, in order to solve the above-mentioned problems, the touch panel according to the present invention is a touch panel that detects contact or approach of an object to a detection surface, including a detection electrode and a driver electrode, wherein the touch panel detects the contact or approach of the object on the basis of a change in amount of an electric charge that is induced on the detection electrode in response to a drive signal applied to the driver electrode, and wherein the touch panel further includes a complementary electrode that forms a capacitance along with the detection electrode, the complementary electrode having applied thereto a complementary signal having a different phase than the drive signal, a voltage change $\Delta Vcm$ of the complementary signal satisfying a formula below:

$$\Delta Vcm = -\Delta Vdr \times (Cfo + Ccr)/Ccm$$

where, in the formula, $\Delta Vdr$ represents a voltage change of the drive signal, $Cfo$ represents a capacitance that is primarily a fringe capacitance between the driver electrode and the detection electrode corresponding to a capacitance component that is not affected by the object, Ccr represents a capacitance that is primarily a cross capacitance between the driver electrode and the detection electrode corresponding to a capacitance component that is not affected by the object, Cfo+Ccr represents a total capacitance between the driver electrode and the detection electrode that is not affected by a presence or absence of the object, and Ccm represents a capacitance formed between the complementary electrode and the detection electrode.

According to the configuration above, by providing a complementary electrode, it is possible to form between the complementary electrode and the detection electrode a parasitic capacitance corresponding to capacitance component that does not affect detection, among the parasitic capacitance formed between the driver electrode and the detection electrode.

Specifically, (Cfo+Ccr) in the formula above represents a parasitic capacitance (Cfo) corresponding to a capacitance component between the driver electrode and the detection electrode that is not affected by an object to be detected among fringe capacitances being added to a parasitic capacitance (Ccr) corresponding to a capacitance component between the driver electrode and the detection electrode that is not affected by an object to be detected among cross capacitances. By multiplying this by (−ΔVdr), the resulting value corresponds to inactive charge that is formed regardless of whether or not an object to be detected is in contact or approaches the detection surface, and thus, by dividing this value by the parasitic capacitance (Ccm) formed between the complementary electrode and the detection electrode, it is possible to calculate the amplitude (ΔVcm) of the complementary signal. At the time of detection, by applying the complementary signal having this amplitude (ΔVcm) to the complementary electrode, of the charge induced on the detection electrode, the charge that is not affected by the object to be detected, or in other words, the inactive charge can be minimized.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present invention, it is possible to provide a highly reliable touch panel in which glitches such as non-detection do not occur.

Fringe capacitance refers to capacitance formed between electrodes in the same layer, while cross capacitance refers to capacitance formed between electrodes in different layers from each other.

The present invention also includes a display device provided with the above-mentioned touch panel.

Effects of the Invention

As stated above, a touch panel according to the present invention is a touch panel that detects contact or approach of an object to a detection surface, including a detection electrode and a driver electrode, wherein the touch panel detects the contact or approach of the object on the basis of a change in amount of an electric charge that is induced on the detection electrode in response to a drive signal applied to the driver electrode, wherein the driver electrode and the detection electrode are, in portions thereof, in different layers from each other, and wherein the touch panel further comprises a complementary electrode that forms a capacitance along with the detection electrode, the complementary electrode having applied thereto a complementary signal having a different phase than the drive signal, a voltage change ΔVcm of the complementary signal satisfying a formula below:

$$\Delta Vcm = -\Delta Vdr \times (Cfo+Ccr)/Ccm$$

where, in the formula, ΔVdr represents a voltage change of the drive signal, Cfo represents a capacitance that is primarily a fringe capacitance between the driver electrode and the detection electrode corresponding to a capacitance component that is not affected by the object, Ccr represents a capacitance that is primarily a cross capacitance between the driver electrode and the detection electrode corresponding to a capacitance component that is not affected by the object, Cfo+Ccr represents a total capacitance between the driver electrode and the detection electrode that is not affected by a presence or absence of the object, and Ccm represents a capacitance formed between the complementary electrode and the detection electrode.

Also, the display device according to the present invention includes the above-mentioned touch panel.

According to the configuration of the present invention, it is possible to provide a highly reliable touch panel in which glitches such as non-detection do not occur.

DETAILED DESCRIPTION OF EMBODIMENTS

Embodiment 1

An embodiment of the present invention will be explained below with reference to FIGS. 1 to 6.

First, an embodiment of a touch panel of the present invention will be explained, and then, an embodiment of a display device of the present invention will be explained.

(1) Configuration of Touch Panel

Figure 1:
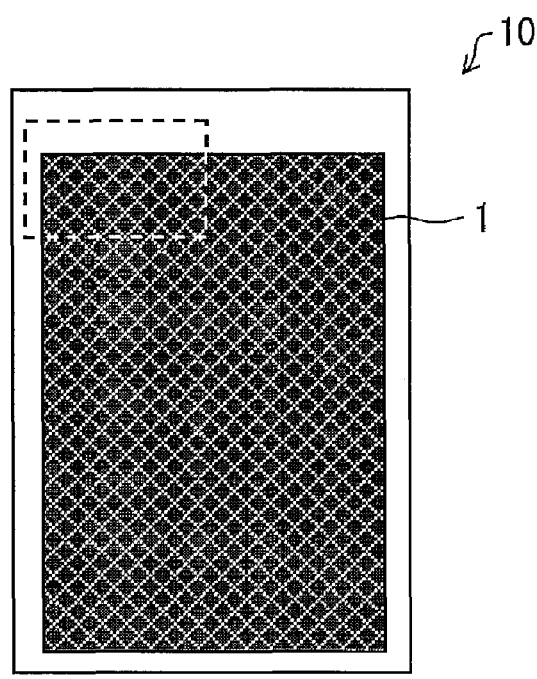
FIG. 1 shows a configuration of a touch panel according to an embodiment of the present invention.
Figure 1:
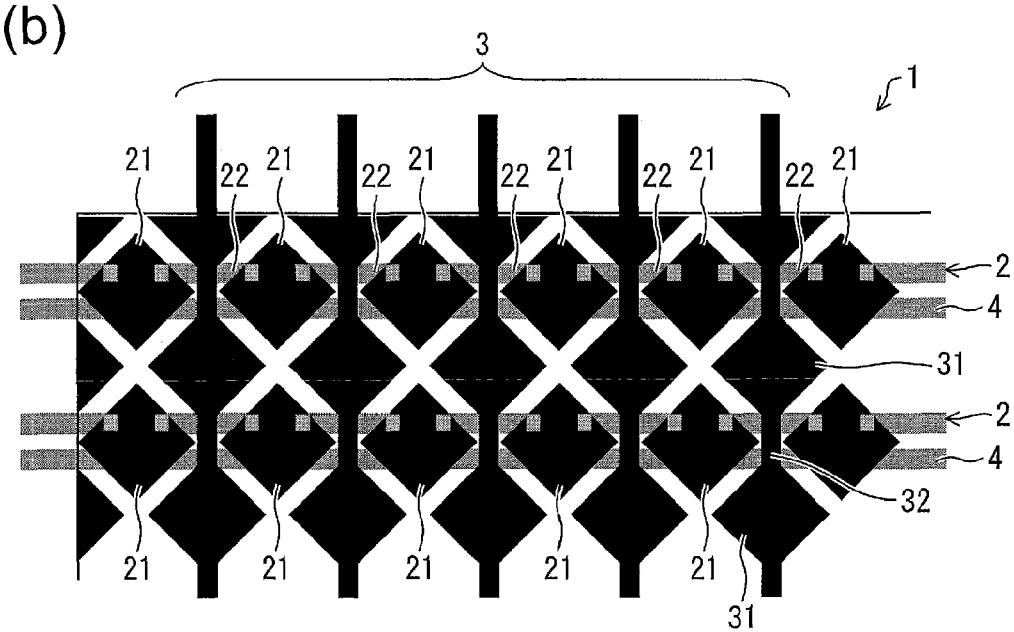

FIG. 1 shows the touch panel of the present embodiment. FIG. 1(a) is a top view of the touch panel, and FIG. 1(b) is a partial magnified view of the touch panel in which the portion in FIG. 1(a) surrounded by the frame is magnified.

The touch panel of the present embodiment detects that a finger, a stylus, or the like of a user has come into contact with or approached a detection surface. Thus, as shown in FIG. 1(a), a touch panel 10 of the present embodiment has a touch panel region 1. In actuality, a protective plate is disposed on the topmost surface of FIG. 1, which is a detection surface of the touch panel region 1, but in FIG. 1, the protective plate is omitted.

A specific configuration of the touch panel region 1 will be described with reference to the touch panel region 1 shown in FIG. 1(b). The touch panel region 1 includes driver electrodes 2, detection electrodes 3, and complementary electrodes 4.

The portions in FIG. 1(b) depicted in grey indicate that these portions are on the same surface, or in other words, in the same layer as each other, and the portions depicted in black indicate that these portions are in a different layer from the grey portions but that the black portions are on the same surface, or in other words, in the same layer as each other. The grey portions are in a different layer from the black portions, and the black portions are closer to the detection surface than the grey portions.

As shown in FIG. 1(b), the driver electrodes 2 have a plurality of driver electrode parts 21, and the driver electrode parts 21 are interconnected by first bridge parts 22.

As shown in FIG. 1(b), the detection electrodes 3 also have a plurality of detection electrode parts 31, and the detection electrode parts 31 are interconnected by second bridge parts 32.

The driver electrode parts 21 and the detection electrode parts 31, as shown in FIG. 1(b), are in the same layer as each other. The second bridge parts 32 are also in the same layer as the driver electrode parts 21 and the detection electrode parts 31. On the other hand, the first bridge parts 22 are in a different layer from the driver electrode parts and the detection electrode parts. Specifically, the first bridge parts 22 are in a layer below the driver electrode parts 21, and, as described below, are in the same layer as the complementary electrodes 4. The first bridge parts 22 and the driver electrode parts 21 overlap each other with a dielectric layer therebetween, and both are electrically connected to each other in portions thereof by a connecting part that extends in a direction of overlap.

The driver electrode parts 21 are respectively quadrilaterals. The plurality of driver electrode parts 21 are aligned along the row direction such that a diagonal line drawn from one set of opposite corners in each quadrilateral extends in the row direction, and the driver electrode parts 21 that are aligned in the row direction are electrically connected to each other by the first bridge parts 22. There are a plurality of such rows, which are aligned in the column direction, parallel to each other. The first bridge parts 22 electrically connect driver electrode parts 21 aligned in the row direction. The driver electrode parts 21 and the first bridge parts 22 are described later with reference to FIG. 2.

The detection electrode parts 31 are, in general, the same shape as the driver electrode parts 21, and are respectively quadrilaterals. The plurality of detection electrode parts 31 are aligned along the column direction such that a diagonal line drawn from one set of opposite corners in each quadrilateral extends in the column direction, and the detection electrode parts 31 that are aligned in the column direction are electrically connected to each other by the second bridge parts 32. There are a plurality of such columns, which are aligned in the row direction, parallel to each other.

The driver electrode parts 21 and the detection electrode parts 31 are disposed in an alternating fashion in the row direction and the column direction, respectively. Specifically, the driver electrode parts 21, as described above, are in the same layer as the detection electrode parts 31, and as shown in FIG. 1(b), are disposed along the row direction and the column direction such that the diagonal lines drawn from the sets of opposite corners of the quadrilaterals are individual lines. In other words, in regions other than the edges of the touch panel region 1, four detection electrode parts 31 are disposed such that four sides of each driver electrode part 21 respectively face the detection electrode parts 31. In other words, a substantially quadrilateral space is formed in the center by a total of four detection electrode parts 31 in two rows and two columns, and in this space, one driver electrode part 21 is disposed.

The second bridge parts 32 are disposed in the same layer so as to separate driver electrode parts 21 adjacent to each other in the row direction.

Figure 2:
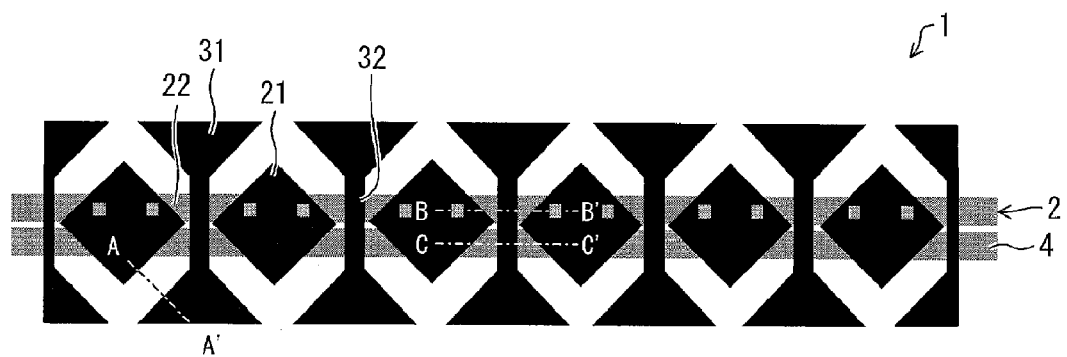
FIG. 2 is a partial magnified view of a touch panel region of the touch panel shown in FIG. 1.
Figure 18:
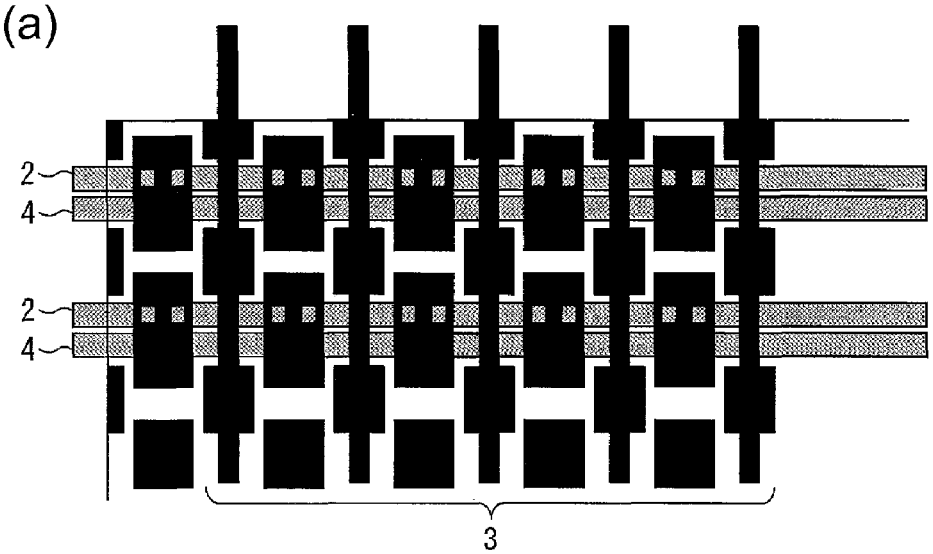
FIG. 18 shows modification examples of an electrode configuration of a touch panel according to the present invention.
Figure 18:
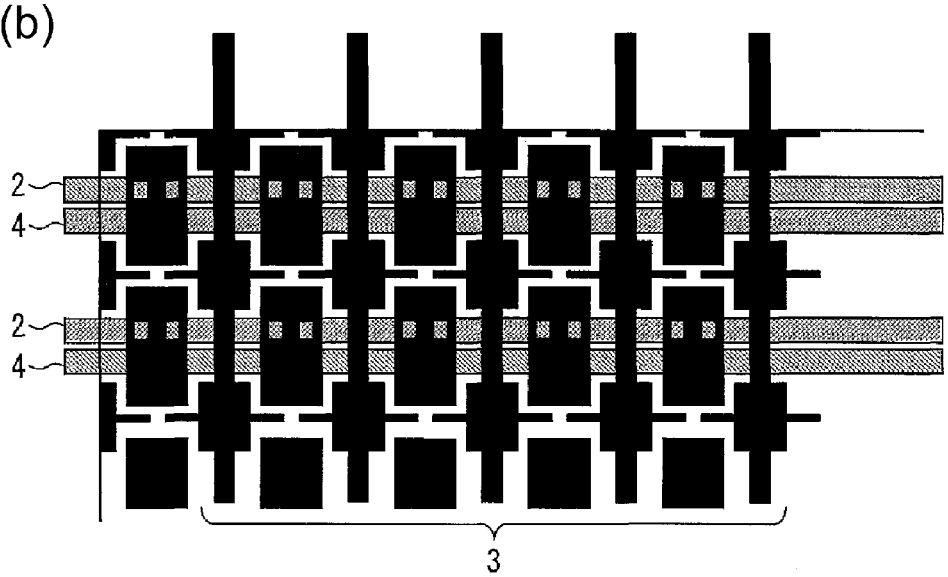
Figure 19:
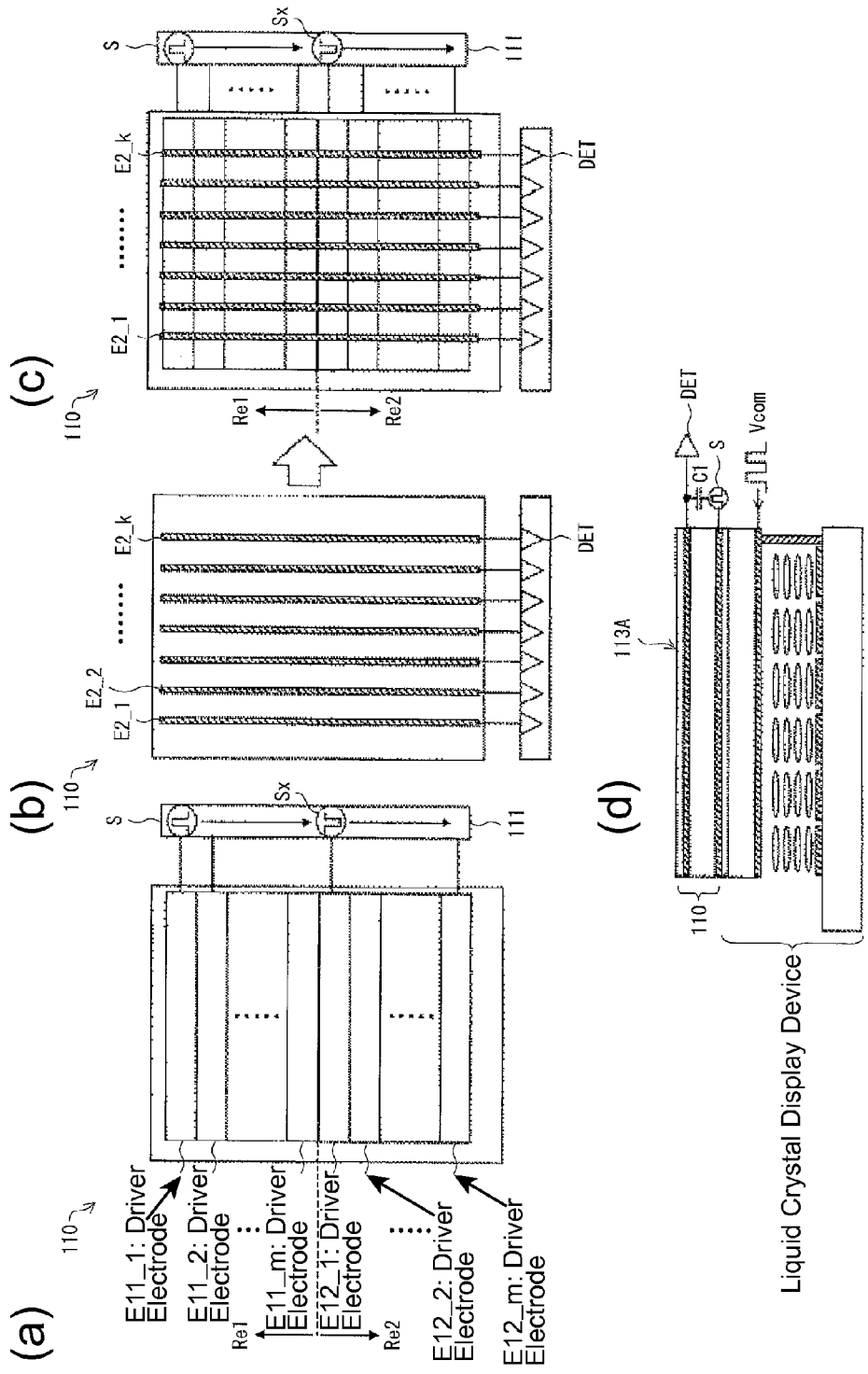
FIG. 19 is a drawing showing a conventional technology.
Figure 20:
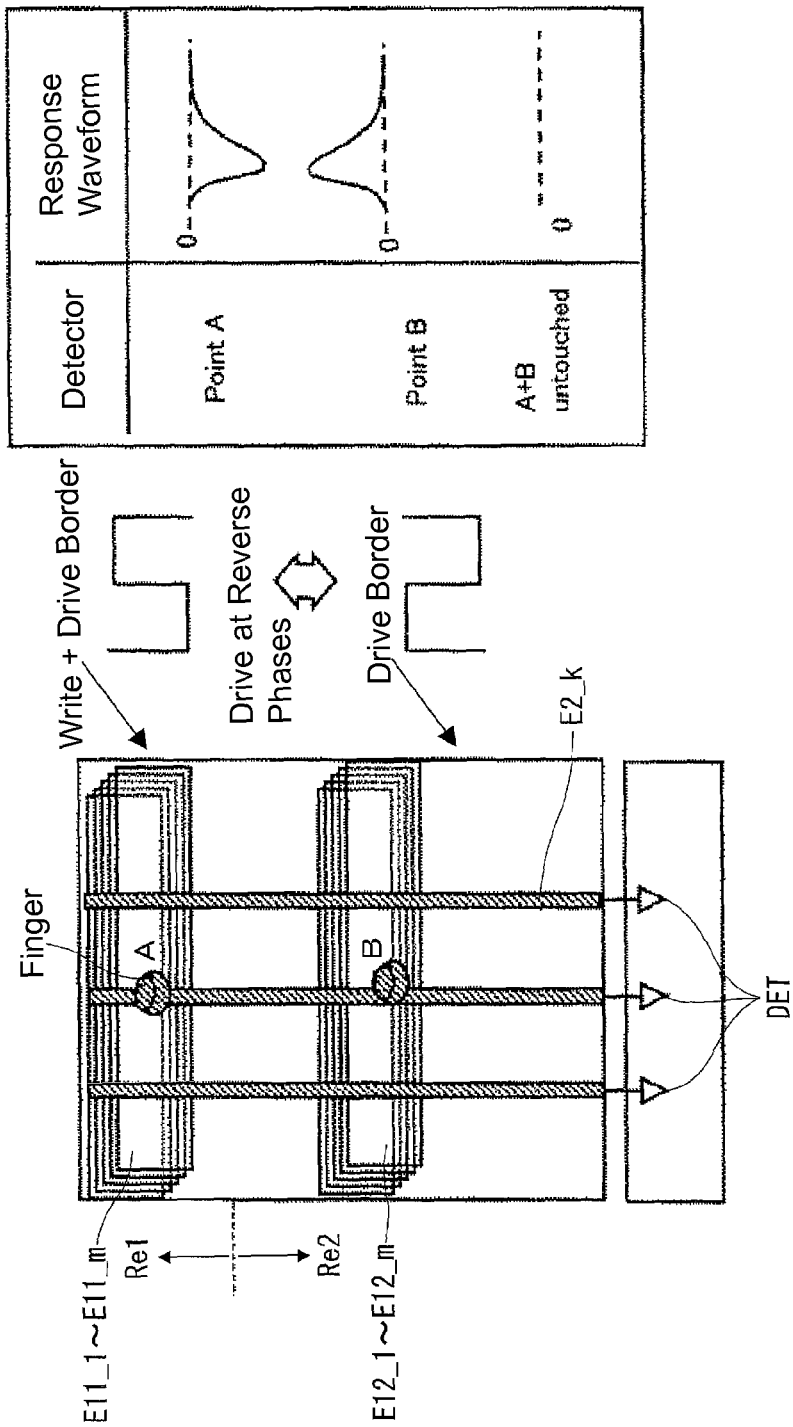
FIG. 20 is a drawing showing a conventional technology.

Here, the shape of the driver electrode parts and the shape of the detection electrode parts as shown in FIGS. 1 and 2 were described, but the shapes are not limited thereto, and shapes of the driver electrode parts and the detection electrode parts shown in FIG. 18 are also possible as another example.

FIG. 2 shows a portion of FIG. 1(b). A detailed configuration of the touch panel region 1 of the touch panel 10 will be described using cross-sectional views of the touch panel 10 along the section line A-A', the section line B-B', and the section line C-C' shown in FIG. 2.

FIG. 3(a) is a cross-sectional view of the touch panel 10 along the section line A-A' shown in FIG. 2. FIG. 3(b) is a cross-sectional view of the touch panel 10 along the section line B-B' shown in FIG. 2. FIG. 3(c) is a cross-sectional view of the touch panel 10 along the section line C-C' shown in FIG. 2.

As shown in FIGS. 3(a) to 3(c), the respective electrodes described above are disposed between the substrate 11 and the protective plate 12. A shield 13 is disposed on the substrate on the side thereof opposite to the protective plate 12.

The shield 13 protects the touch panel 10 from external shocks, and protects the touch panel from external electromagnetic waves that interfere with the touch panel function, or in other words, the touch sensor function. The shield 13 can be made of a conventional material, and disposed using a conventional method.

The touch sensor function of the touch panel 10 of the present embodiment will be described. In the position shown in FIG. 3(*a*), an insulating film 14 is formed on the substrate 11, and on the insulating film 14, the driver electrode parts 21 and the detection electrode parts 31 are provided. In this position, a voltage (drive signal) is applied to the driver electrode parts 21, and thus, as shown with the lines of electric force in arrows in FIG. 3(*a*), a parasitic capacitance is formed between the driver electrode parts 21 and the detection electrode parts 31 through the insulating film 14, the substrate 11, and the protective plate 12. With such a parasitic capacitance formed, as shown in FIG. 4, when a finger, for example, comes into contact with or approaches the detection surface, the parasitic capacitance changes, and by having the detection electrodes 3 detect such changes, it is possible to detect contact or approach to the detection surface. This is the principle behind the so-called capacitive touch sensor. Below, only a case in which contact is made is described, but the description applies similarly to approach as well.

When viewing the parasitic capacitance in detail with reference to FIG. 4, it is possible to see that a parasitic capacitance Cfo that does not change even if a finger comes into contact is present. This parasitic capacitance Cfo is a component that is not affected by an object to be detected.

In other words, between the driver electrode parts 21 and the detection electrode parts 31 in the same layer as each other, there is both a parasitic capacitance Cfo that is not affected by the object to be detected, and a parasitic capacitance Cfs that is affected by the object to be detected.

Figure 3:
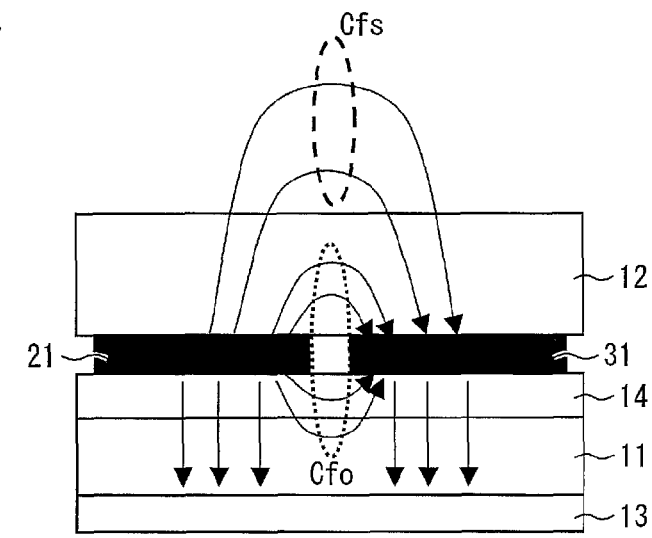
FIG. 3 shows cross-sectional views of the touch panel region shown in FIG. 2.
Figure 3:
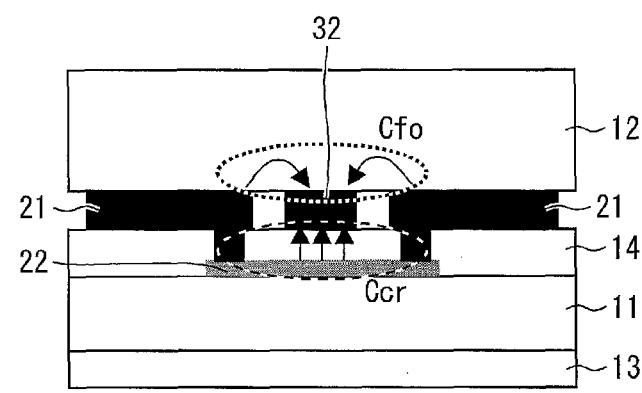
Figure 3:
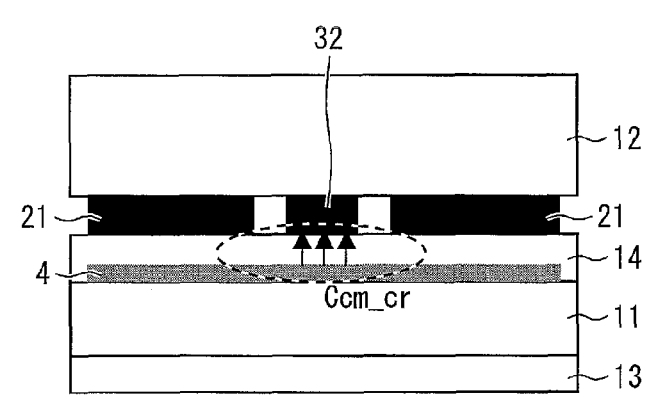
Figure 4:
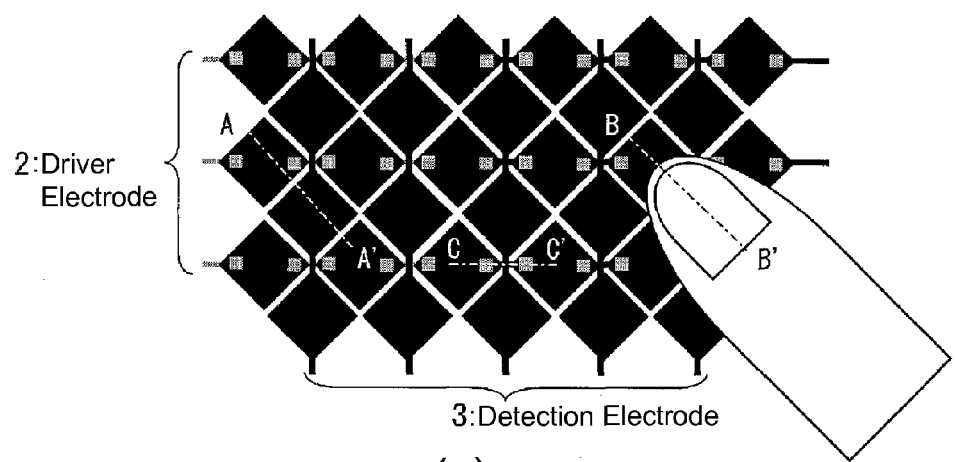
FIG. 4 shows a change in parasitic capacitance due to contact or non-contact of an object to be detected in the touch panel region shown in FIG. 2.
Figure 4:
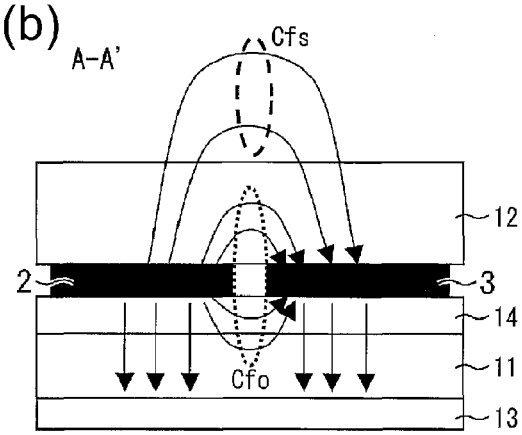
Figure 4:
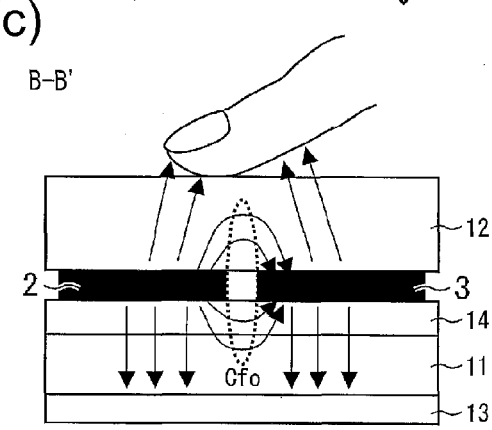
Figure 4:
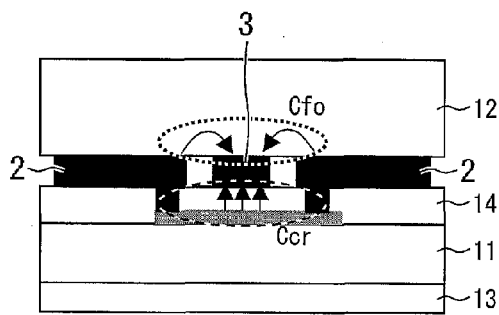

Also, the parasitic capacitance Cfo is formed between the driver electrode parts 21 and the second bridge part 32 in the same layer shown in FIG. 3(*b*). The driver electrode parts 21 and the second bridge part 32 are close to each other, and here as well, a parasitic capacitance Cfo is formed regardless of whether or not a finger has come into contact.

As shown in FIG. 3(*b*), a parasitic capacitance Ccr is formed between the first bridge part 22, which electrically connects driver electrode parts 21 aligned in the row direction, and the second bridge part 32, regardless of whether or not a finger has come into contact.

As for other parasitic capacitance, a parasitic capacitance Ccm_cr formed between the complementary electrode 4 to be described later and the detection electrode 3 is also present.

To summarize,

Cfo is a component of the fringe capacitance between the driver electrodes and the detection electrodes that is not affected by an object to be detected, Cfs is a component of the fringe capacitance between the driver electrodes and the detection electrodes that is affected by an object to be detected, Ccr is a component of the cross capacitance between the driver electrodes and the detection electrodes that is affected by an object to be detected, and Ccm_cr is a cross capacitance between the detection electrodes and the complementary electrodes. Here, fringe capacitance refers to capacitance formed within the same layer, and cross capacitance refers to capacitance formed in different layers.

To reiterate the explanation of the principle of the touch sensor function, if the capacitance between the driver electrodes and the detection electrodes is Cf, then an electrical charge Q induced on the detection electrode if the driver electrode is driven once at ΔVdr is expressed in the following formula:

$$Q = \Delta Vdr \times Cf.$$

Based on FIG. 4, the non-contact state capacitance Cf and the contact state capacitance Cf are as follows:

in the non-contact state, $Cf = Cfo + Cfs + Ccr$, and in the contact state, $Cf = Cfo + Ccr$.

Where the non-contact state induced charge is Q and the contact state induced charge is Q@Touch, $$Q = \Delta Vdr \times (Cfo + Cfs + Ccr), \text{ and}$$

$$Q@\text{Touch} = \Delta Vdr \times (Cfo + Ccr),$$

and a charge Qsig representing the detected signal is such that $$Q\text{sig} = Q - Q@\text{Touch} = \Delta Vdr \times Cfs.$$

Thus, the circuit receiving the induced charge (integrator or decision circuit) uses, for determination, the width of the detected signal charge Qsig upon obtaining a sufficient width to be able to receive a non-contact state induced charge Q as an input dynamic range.

Figure 5:
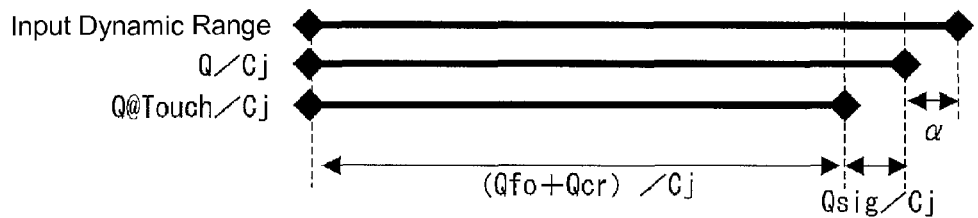
FIG. 5 schematically shows a relation between widths of an input dynamic range, an induced electric charge Q in a non-contact state, an induced electric charge Q@Touch in a contact state, and a detected signal charge Qsig in the touch panel shown in FIG. 1.

FIG. 5 schematically shows the relation of the widths of the input dynamic range, the non-contact state induced charge Q, the contact state induced charge Q@Touch, and the detected signal charge Qsig. In FIG. 5, a represents the input dynamic range margin, and Cj represents the received capacitance value (value of capacitance in which the induced charge is charged).

In FIG. 5, Qsig/Cj is the width used in order to determine whether or not contact has actually taken place.

Based on FIG. 5, the real determination width ratio Rd for the dynamic range is as follows:

$$Rd = Cfs / ((Cfo + Cfs + Ccr) + \alpha Cj / \Delta Vdr).$$

In FIG. 5, (Qfo+Qcr)/Cj does not contribute to determination. An object of the present invention is to reduce this portion. In other words, the object is to mitigate charge of this portion.

In order to attain this object, in the present embodiment, as shown in FIGS. 1 to 3, complimentary electrodes 4 are provided.

The complementary electrodes 4 extend in parallel with the driver electrodes 2 (row direction) along the extension direction of the driver electrodes 2 in the touch panel region 1 shown in FIG. 1. The driver electrodes 2 and the complementary electrodes 4 are aligned along the column direction in an alternating fashion. As shown in FIGS. 1 and 2, the complementary electrodes 4 are in the same layer as the first bridge parts 22.

As for the complementary electrode 4 disposed in this manner, where the parasitic capacitance between the complementary electrode and the detection electrode is Ccm (=Ccm_cr), and the complementary signal amplitude (voltage change) is ΔVcm, the amount of charge induced when the complementary electrode and the driver electrode are driven simultaneously is as follows:

$$Q = \Delta Vdr \times (Cfo + Cfs + Ccr) + \Delta Vcm \times Ccm, \text{ and}$$

$$Q@\text{Touch} = \Delta Vdr \times (Cfo + Ccr) + \Delta Vcm \times Ccm.$$

Here, by setting ΔVcm and Ccm (=Ccm_cr) such that $$\Delta Vcm \times Ccm \approx -\Delta Vdr \times (Cfo + Ccr),$$

it is possible to mitigate the occurrence of charge that does not contribute to determination.

In other words, the configuration is such that when applying the drive signal to the driver electrodes 2, a complementary signal at a different phase from the drive signal is applied to the complementary electrodes 4, and the amplitude ($\Delta Vcm$) of the complementary signal satisfies the following formula:

$$\Delta Vcm = -\Delta Vdr \times (Cfo+Ccr)/Ccm$$

Cfo+Ccr in the formula corresponds to Cf−Cfs, and to a capacitance component unnecessary for detection.

The complementary signal is generated by a complementary signal generating circuit, which is not shown in the drawings, included in the touch panel, and a drive signal is inputted to the complementary signal generating circuit. The complementary signal generating circuit reverses the inputted drive signal, thus generating the complementary signal. Thus, an appropriate complementary signal based on the drive signal is generated and applied to the complementary electrodes.

In order to fulfill the formula above, when considering a calibration step for when the touch panel is shipped, for example, one method is to bring a conductive plate into contact so as to cover the touch panel (Cfs=0), and set $\Delta Vcm$ such that the detection electrode signal output in relation to the driver electrode signal at this time is at a minimum. An adjustment method at this time is to set the Rf in the complementary signal generating mechanism shown in FIG. 12(*a*) to be mentioned later as volume resistance, and to manually set $\Delta Vcm$ while monitoring the detection electrode signal. It is also possible to automate this step by having a similar control function in the complementary signal generating mechanism.

Figure 6:
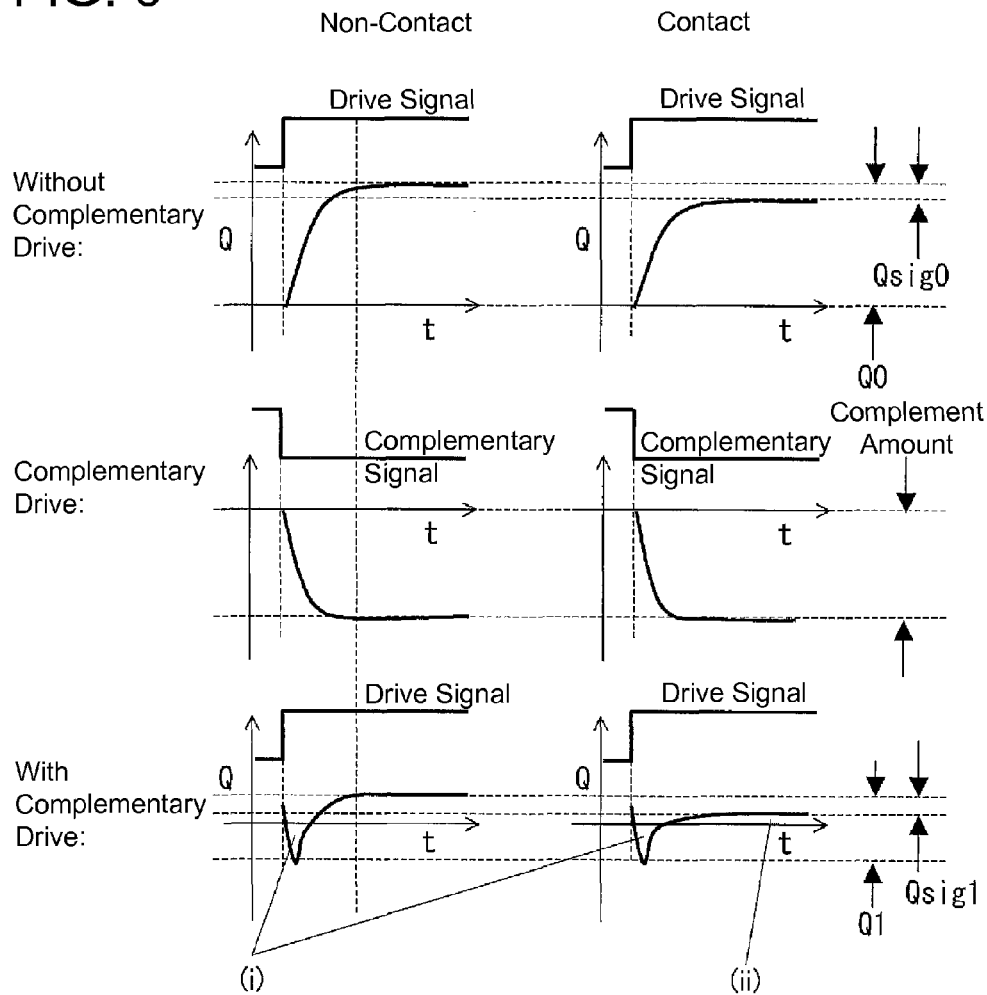
FIG. 6 is a drawing for explaining the effect of the complementary electrode.

FIG. 6 is a drawing for describing effects by the complementary electrodes 4. The respective graphs of FIG. 6 have the horizontal axis as time, and the left three graphs of FIG. 6 show a non-contact state and the right three graphs thereof show a contact state. The top two graphs of FIG. 6 show a relation between time "t" and an amount of charge Q (vertical axis) in a configuration of a comparison example in which a complementary electrode is not provided. The middle two graphs of FIG. 6 show a relation between time "t" and a complement amount of a complementary electrode (vertical axis). The bottom two graphs of FIG. 6 show a relation between time "t" and the amount of charge Q (vertical axis) when the complementary electrode and the driver electrode are driven.

In the top two graphs of FIG. 6, Q0 represents the total signal amount and Qsig0 represents a net signal amount, or in other words, the signal amount for detecting whether or not there is contact. As described above in FIG. 4, Qsig0 satisfies the following:

$$Qsig0 = Q - Q@Touch = \Delta Vdr \times Cfs.$$

This represents the difference between the amount of charge induced on the detection electrode when there are no objects to be detected, and the amount of charge induced on the detection electrode when an object to be detected has come into contact with (approached) the detection electrode.

The top two graphs of FIG. 6 indicate that the amount of change in the charge (=net signal amount Qsig0) resulting from an object to be detected is small in relation to the total amount of charge (=total signal amount Q0) including charge that is not affected by the object to be detected.

By applying complementary signals shown in the middle two graphs of FIG. 6 to the complementary electrode when applying drive signals shown in the top two graphs of FIG. 6, the total signal amount Q1 and the net signal amount Qsig1, which are obtained by applying the drive signals, result as shown in the bottom two graphs of FIG. 6.

The positions indicated with (i) in the bottom two graphs of FIG. 6 are positions in which a difference due to a time constant occurs in the detection electrode. The position indicated with (ii) is a position where a residual effect between $\Delta Vcm \times Ccm$ and $\Delta Vdr \times (Cfo+Ccr)$ appears.

The top two graphs and the bottom two graphs of FIG. 6 have the following relationship:

$$Q1 < Q0,$$

$$Qsig1 \approx Qsig0, \text{ and}$$

$$Qsig1/Q1 > Qsig0/Q0.$$

Thus, in the touch panel 10 of the present invention, by providing complementary electrodes 4, (1) it is possible to reduce the input dynamic range of the charge receiving circuit depending on the total signal amount, thereby attaining low power consumption by performing low voltage driving, and (2) it is possible to improve signal resolution (resolution). As an example, if the total signal amount has a 12-bit resolution, then if Qsig1/Q1=½ and Qsig0/Q0=¼, then the resolution of Qsig1 is 11-bit and the resolution of Qsig0 is 10-bit.

(2) Configuration of Display Device

Next, a display device to which the above-mentioned touch panel is installed will be described.

Figure 13:
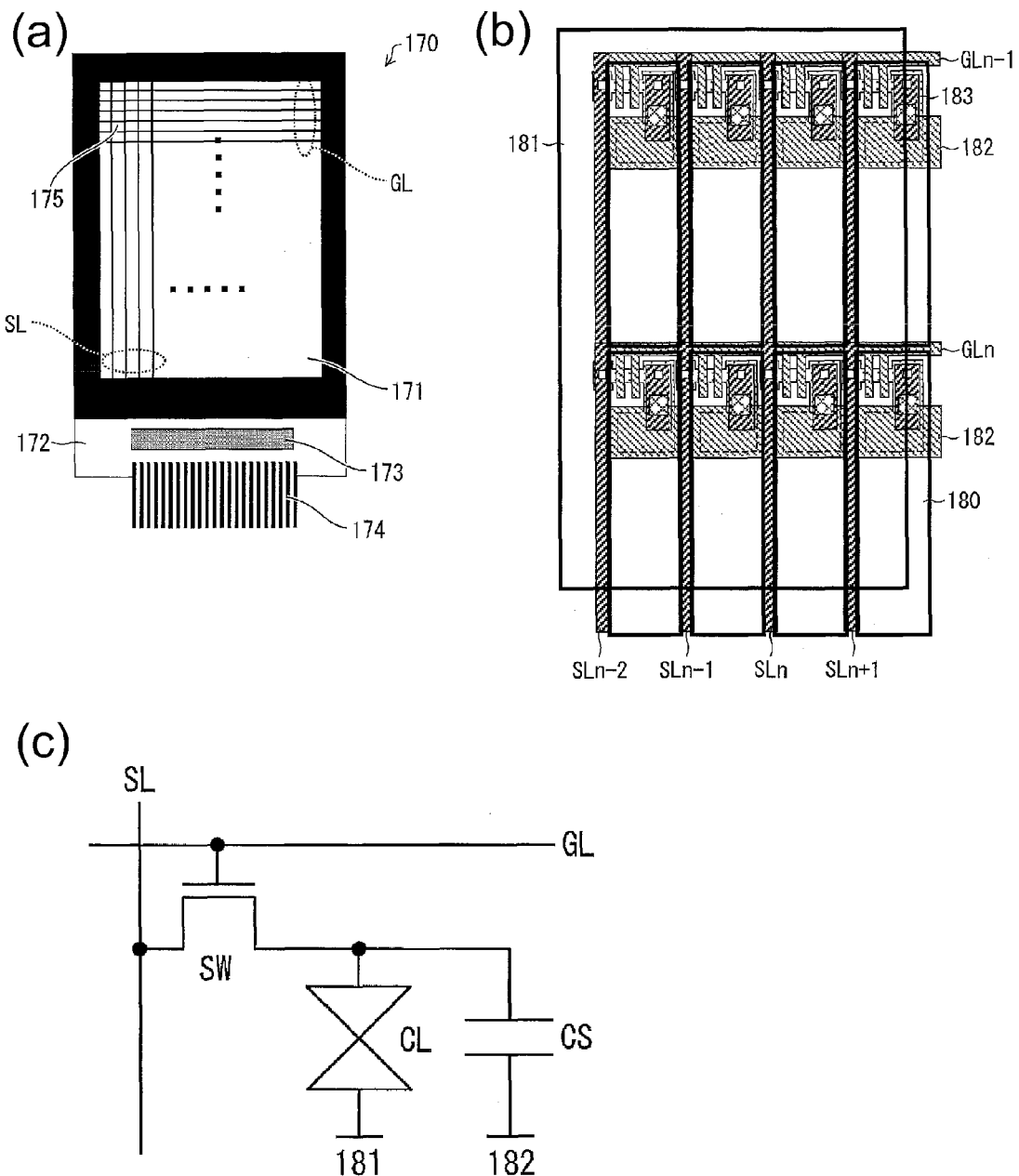
FIG. 13 shows a display device including a touch panel according to an embodiment of the present invention.

Here, as an example of a display device, first, a configuration of a general liquid crystal display device will be described with reference to FIG. 13. FIG. 13(*a*) is a top view of the liquid crystal display device.

The liquid crystal display device 170 has a configuration in which a plurality of image signal lines SL and a plurality of scanning signal lines GL intersect each other, and includes a driver 173 in a frame 172 of the liquid crystal display device adjacent to the display region 171, and a flexible substrate 174 provided with lines to connect to the power source and the like. In the display region 171, pixels 175 are provided at the intersections between the image signal lines SL and the scanning signal lines GL.

Details of the display region 171 will be described with reference to FIG. 13(*b*). FIG. 13(*b*) is an exploded view of the display region 171. In FIG. 13(*b*), pixel areas not covered by a common electrode are present for ease of description, but in reality, all pixel areas are covered by the common electrode.

The display region 171 includes pixel electrodes 180 arranged in a matrix, a common electrode 181 disposed opposite to the pixel electrodes 180 with a liquid crystal layer therebetween, auxiliary capacitance lines 182 that form an auxiliary capacitance Cs between the pixel electrodes 180 and the auxiliary capacitance lines 182, and switching elements 183 connected to the image signal lines SL and the scanning signal lines GL and performing switching on the pixel electrodes 180.

The liquid crystal display device 170 is an active matrix liquid crystal display device that uses a drive method in which, when each of the switching elements 183 is in the on period, an image signal voltage with its signal voltage polarity reversed every field period of the display screen is applied to each of the pixel electrodes 180, and in the off period of the switching element 183, a modulated signal in the opposite direction is applied to the auxiliary capacitance lines 182 every field period, thereby changing the potential of the pixel electrodes 180. This allows the change in potential and the pixel signal voltage to overlap or cancel each other out, and this voltage is applied to the liquid crystal layer. A circuit configuration of one pixel is shown in FIG. 13(c).

In the display device of the present embodiment, a touch panel (function) is installed on the above-mentioned liquid crystal display device.

Specifically, touch panels can be broadly categorized as an on-cell type or an in-cell type. On-cell type is a type in which a touch panel is attached to the surface of a liquid crystal display device such as that mentioned above. In-cell type refers to a type in which a touch panel function is installed in a liquid crystal display device such as that mentioned above, and in which the touch panel uses some of the electrode configurations used in the display device.

Below, first, an on-cell type liquid crystal display device will be described.

Figure 14:
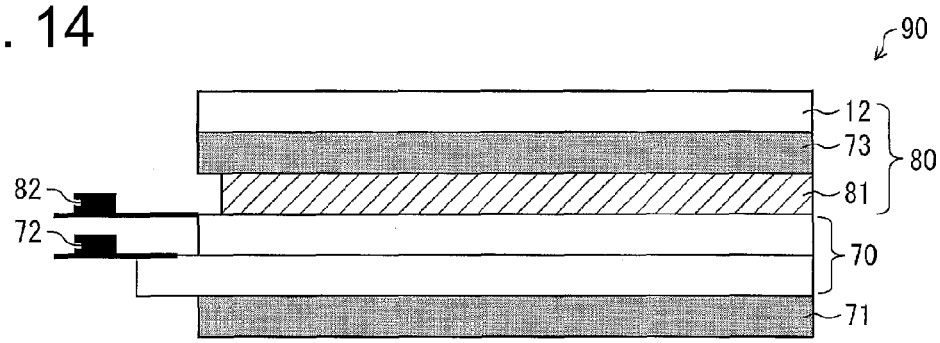
FIG. 14 shows a display device including a touch panel according to an embodiment of the present invention.

FIG. 14 is a schematic cross-sectional view of an on-cell type liquid crystal display device 90 of the present embodiment.

The liquid crystal display device 90 shown in FIG. 14 includes a liquid crystal display part 70, and a touch panel part 80 attached to the display surface side of the liquid crystal display part 70.

The liquid crystal display part 70 has a pair of substrates with a liquid crystal layer therebetween, and on the rearmost surface, a first polarizing plate 71 is provided. This liquid crystal display part 70 has the configuration shown in FIG. 13. Therefore, various electrodes shown in FIG. 13 are provided between the pair of substrates shown in FIG. 14. The liquid crystal display part 70 is also provided with a display driver 72 that applies a voltage (signal) to the electrodes.

The touch panel part 80 has the configuration of the touch panel of FIG. 1 already explained in the present embodiment, but on the display side (light-emitting side) substrate of the pair of substrates in the liquid crystal display part 70, various electrodes 81 (driver electrodes, detection electrodes, and complementary electrodes) shown in FIGS. 1 and 2 are formed.

The touch panel part 80 is provided with a second polarizing plate 73 between the protective plate 12 and the various electrodes 81. The touch panel part 80 is also provided with a detection driver 82 that applies a voltage (signal) to the various electrodes 81.

In this manner, an on-cell type liquid crystal display device 90 of the present embodiment can detect that an object to be detected is in contact with or approaching a detection surface (surface of the protective plate 12) in the touch panel part 80 in a state in which images are displayed in the liquid crystal display part 70.

The above-mentioned on-cell type liquid crystal display device is one example and the present invention is not limited thereto; the present invention can be applied to various types of on cell-type liquid crystal display devices.

The present invention is not limited to a configuration in which various electrodes of the touch panel are formed on the substrate of the liquid crystal display part, and a configuration may be used in which the second polarizing plate is provided on the liquid crystal display part, and on the second polarizing plate, everything from the substrate 11 to the protective plate 12 shown in FIG. 3 is attached. However, in order to allow a thinner configuration, a configuration such as one in which the substrate 11 is omitted and the various electrodes are formed on the second polarizing plate may be used.

Next, an in-cell type liquid crystal display device will be described.

Figure 15:
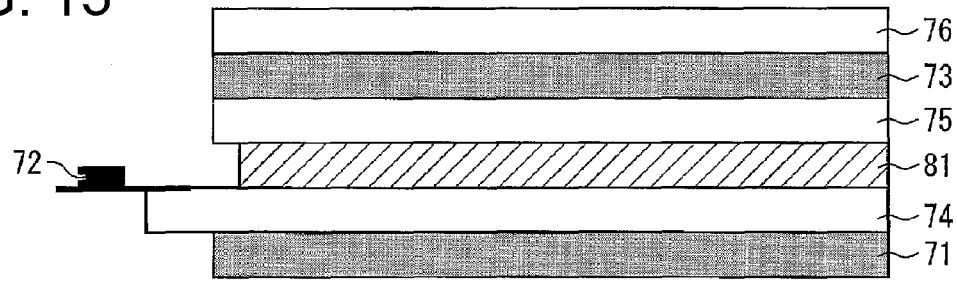
FIG. 15 shows a display device including a touch panel according to an embodiment of the present invention.

FIG. 15 is a cross-sectional view that shows a schematic configuration of an in-cell type liquid crystal display device. In FIG. 15, various electrodes 81 of the touch panel are formed between the first substrate 74 and the second substrate 75, which constitute the pair of substrates of the liquid crystal display.

As an example of a configuration of FIG. 15, the driver electrodes and the detection electrodes are in the same layer, for example, and are disposed on the liquid crystal layer side of the first substrate 74 of the liquid crystal display.

The in-cell type liquid crystal display device is not limited to the configuration of FIG. 15.

Below, a driving method will be described for an in-cell type, in which the common electrode for display is shared with the driver electrodes and the detection electrodes for the touch panel.

Figure 16:
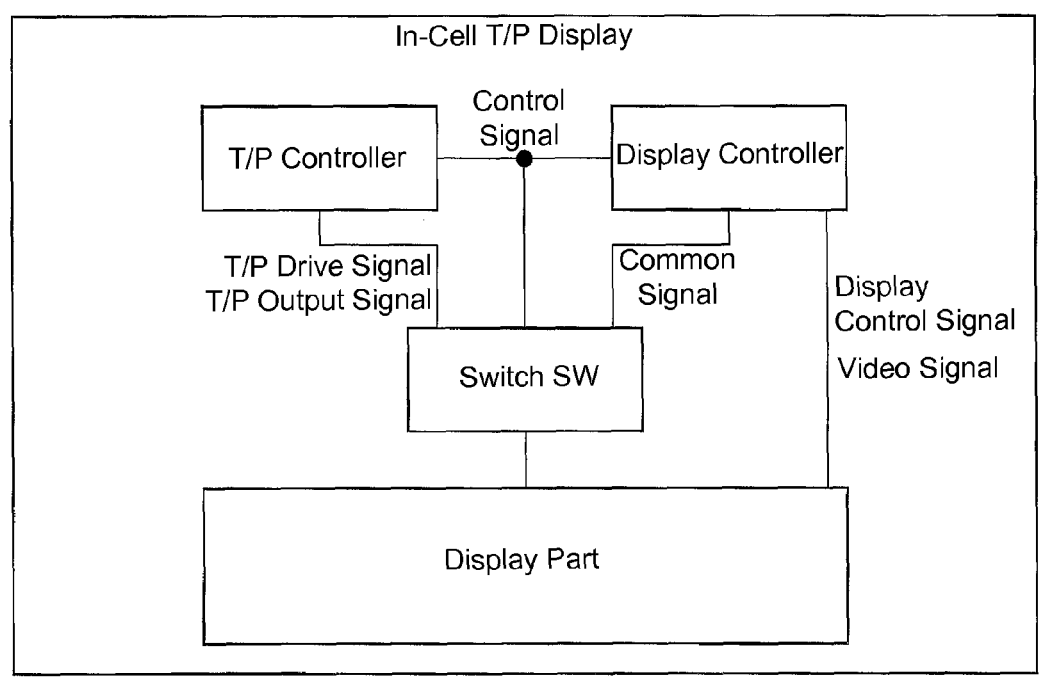
FIG. 16 is a drawing for explaining how a display device including a touch panel according to the present invention is driven.

FIG. 16 shows a schematic view of an in-cell touch panel (T/P) display. The common electrode for display is shared with the T/P driver electrodes and the T/P detection electrodes, and thus, a switch for supplying to the common electrode for display any of the common signal, the T/P driving signal, and the T/P detection signal (the detection signal is extracted) is included.

Figure 17:
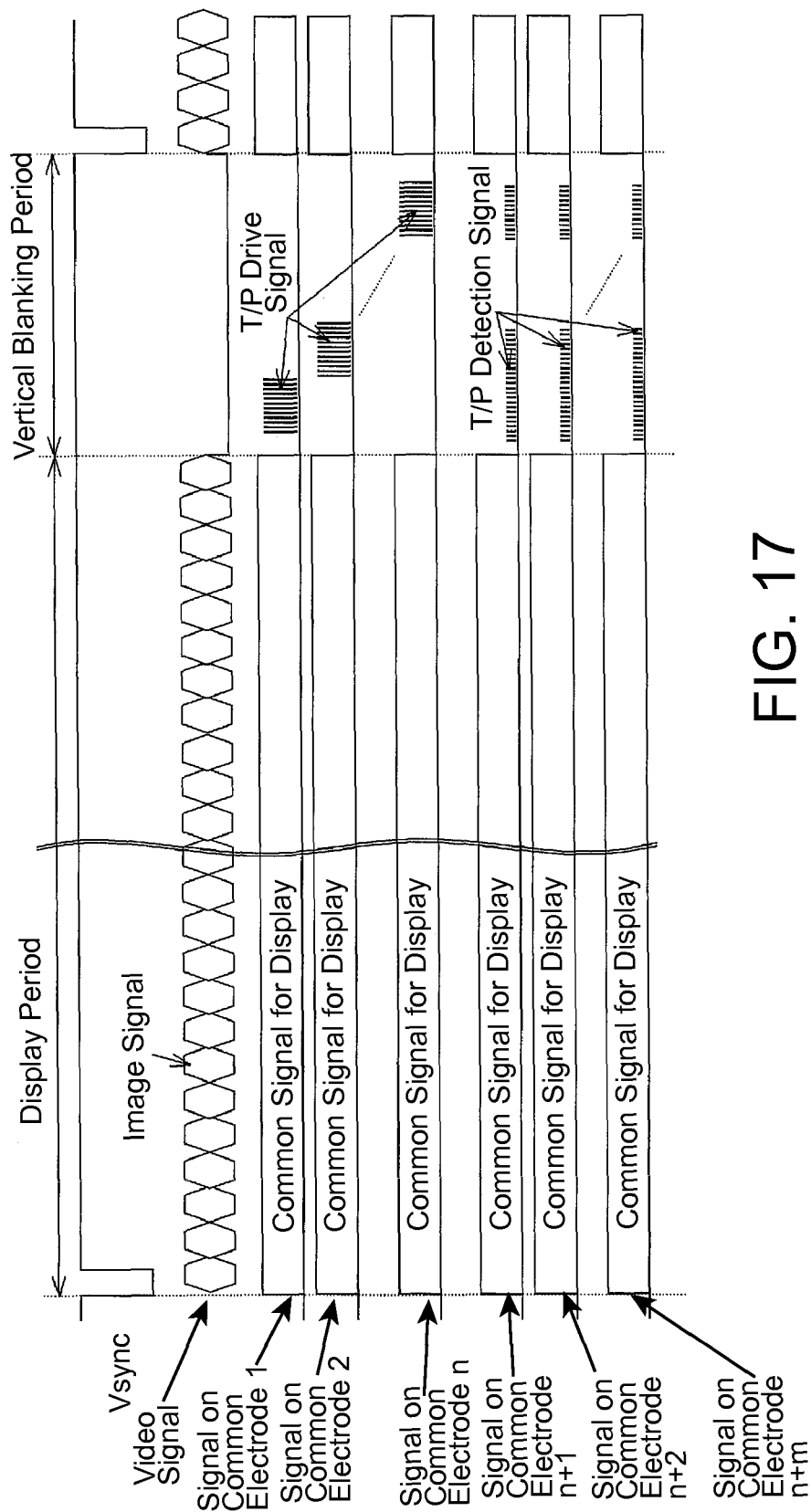
FIG. 17 is a drawing for explaining how a display device including a touch panel according to the present invention is driven.

FIG. 17 shows a schematic drive timing chart, and by using the above-mentioned switch, during a display period, a common signal is inputted to the common electrode for display and normal display is performed, and during a vertical blanking period, the T/P drive signal is supplied to the common electrode for display, and the T/P detection signal is extracted. In FIG. 17, an example is shown in which the common electrode for display is divided into n+m blocks, where blocks 1 to n function as a driver electrode, while blocks n+1 to n+m function as a detection electrode.

The display device according to the present embodiment can be applied as a display device with a touch sensor integrally incorporated therein. Besides this, the display device is suitable to various electronic devices that include touch sensor functionality. This display device can also be applied to personal computers and various portable devices such as mobile phones and laptop computers.

(3) Effects of the Present Embodiment

As stated above, according to the configuration of the touch panel 10 of the present embodiment, by disposing a complementary electrode 4, it is possible to form between the complementary electrode and the detection electrode a parasitic capacitance corresponding to a capacitance component that does not affect detection, among the parasitic capacitance formed between the driver electrode 2 and the detection electrode 3.

Specifically, in (Cfo+Ccr) in the above formula, a parasitic capacitance (Cfo) corresponding to a capacitance component that is not affected by the object to be detected among fringe capacitances between the driver electrode 2 and the detection electrode 3 is added to a parasitic capacitance (Ccr) corresponding to a capacitance component that is not affected by the object to be detected among cross capacitances between the driver electrode 2 and the detection electrode 3. By multiplying this value by (−ΔVdr), the resulting value corresponds to inactive charge that is generated regardless of whether or not an object to be detected is in contact with or approaches the detection surface, and thus, by dividing this value by the parasitic capacitance (Ccm) formed between the complementary electrode and the detection electrode, it is possible to calculate the amplitude (ΔVcm) of the complementary signal. At the time of detection, by applying the complementary signal having this amplitude (ΔVcm) to the complementary electrode 4, of the parasitic capacitance induced on the detection electrode, the charge that is not affected by the object to be detected, or in other words, the inactive charge can be minimized.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present embodiment, it is possible to provide a highly reliable touch panel in which glitches such as non-detection do not occur.

Also, according to the present embodiment, the complementary electrodes and the driver electrodes have different shapes, and thus, it is possible to independently use optimal shapes to form the parasitic capacitance component necessary for each of the electrodes. For example, it is possible for the complementary electrode to have a shape that can achieve an optimal capacitance value (Cm) in order to minimize the inactive charge induced by the driver electrode on the detection electrode, and to have a shape that can minimize the parasitic capacitance component of the detection electrode that is affected by the object to be detected, and it is possible for the driver electrode to have a shape that can maximize the parasitic capacitance component that is affected by the object to be detected. As for the "different shapes," the electrodes may have different widths.

Embodiment 2

Another embodiment according to the present invention is as described below with reference to FIGS. 7 to 9. In the present embodiment, differences from Embodiment 1 above will be described, and for ease of explanation, components having the same functions as those described in Embodiment 1 are given the same reference characters, and the descriptions thereof are omitted.

The difference between the touch panel of Embodiment 1 and the touch panel of the present embodiment is only that the position of the electrodes is different. Thus, only the position of the electrodes will be described below.

Figure 7:
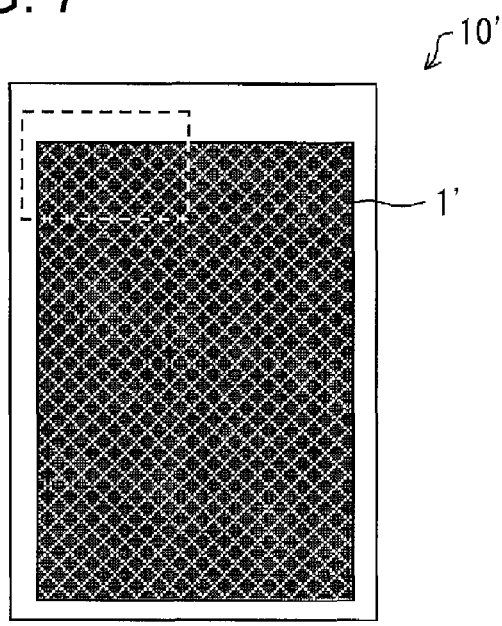
FIG. 7 shows a configuration of a touch panel according to another embodiment of the present invention.
Figure 7:
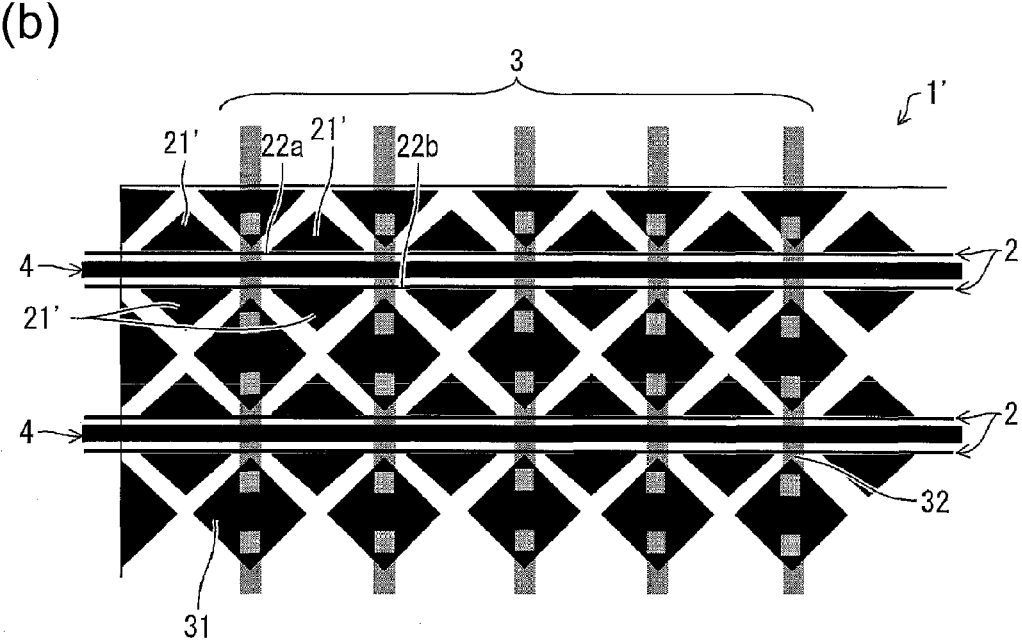

FIG. 7 is a drawing that shows a touch panel 10' of the present embodiment. FIG. 7(a) is a top view of the touch panel corresponding to FIG. 1(a), and FIG. 7(b) is a partial magnified view of a touch panel region corresponding to FIG. 1(b).

In the touch panel region of the present embodiment, as shown in FIG. 7(b), among driver electrode parts 21', first bridge parts 22, detection electrode parts 31, second bridge parts 32, and complementary electrodes 4, only the second bridge parts 32 that connect the detection electrode parts 31 in the column direction are shown in grey. In other words, the driver electrode parts 21', the first bridge parts 22, the detection electrode parts 31, and the complementary electrodes 4 are in the same layer, and are closer to the detection surface than the second bridge part 32.

The first bridge parts 22 that connect the driver electrode parts 21' with each other in the row direction extend along the row direction in the same layer as the driver electrode parts 21' and the detection electrode parts 31. In other words, the detection electrode parts 31 aligned along the column direction are separated by the first bridge parts 22.

The first bridge parts 22 are constituted of a first bridge part 22a and a first bridge part 22b proximal to each other in the column direction. The first bridge part 22a and the first bridge part 22b are disposed between detection electrode parts 31 adjacent to each other in the column direction.

The first bridge part 22a and the first bridge part 22b are disposed between detection electrode parts 31 adjacent to each other in the column direction, and between the first bridge part 22a and the first bridge part 22b, a complementary electrode 4 is formed.

The driver electrode parts 21' differ from those of Embodiment 1 in having a triangular shape. The triangular driver electrode parts 21' are disposed in a substantially triangular space formed by dividing a substantially quadrilateral space formed in the same layer as the detection electrode part 31 by the arrangement of quadrilateral detection electrode parts 31 in FIG. 7(b) by the first bridge part 22a and the first bridge part 22b in the column direction.

Figure 8:
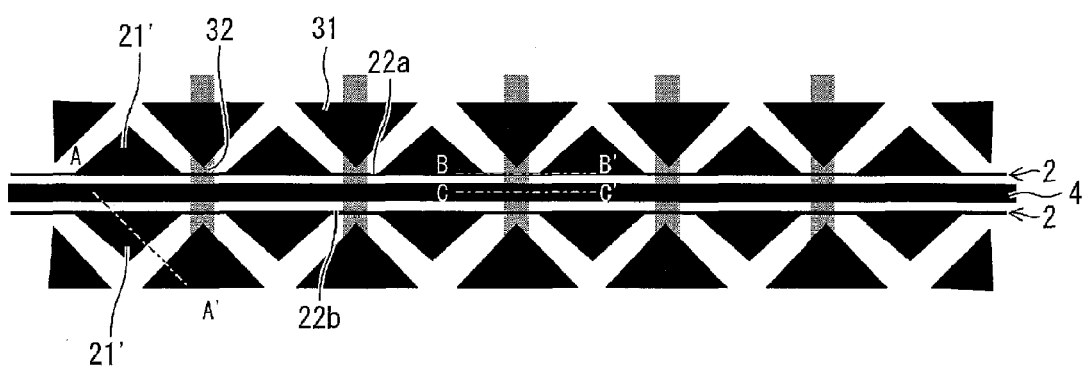
FIG. 8 is a partial magnified view of a touch panel region of the touch panel shown in FIG. 7.
Figure 9:
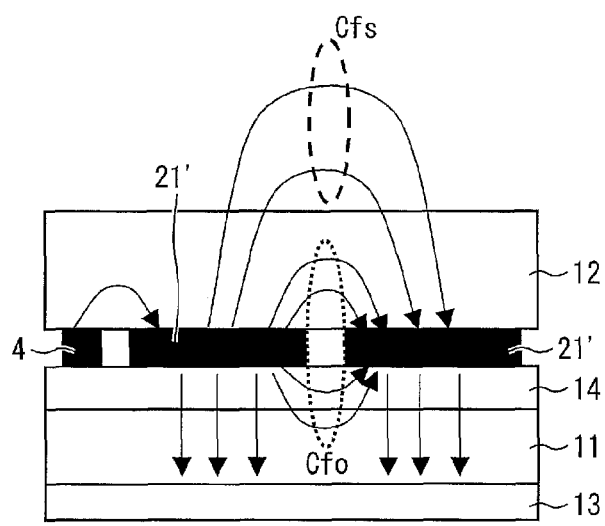
FIG. 9 shows cross-sectional views of the touch panel region shown in FIG. 8.
Figure 9:
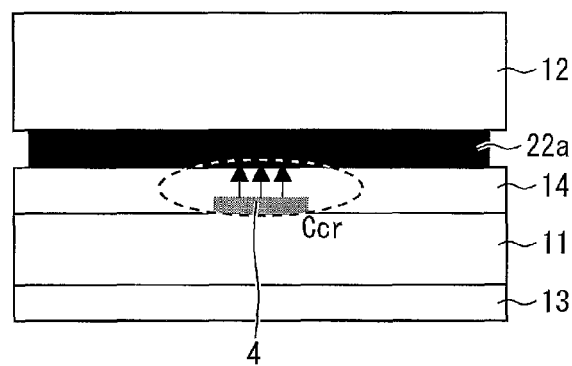
Figure 9:
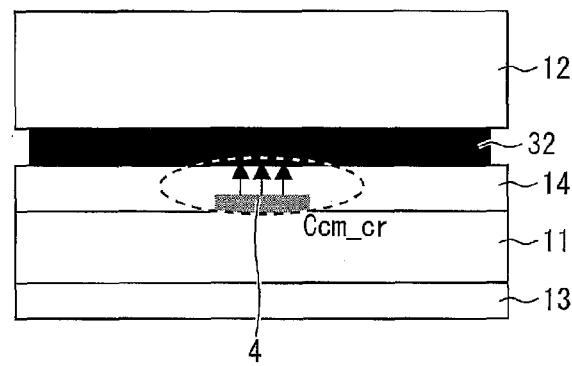

FIG. 8 is a partial magnified view of FIG. 7. As shown in FIG. 8, the second bridge part 32 is disposed in a layer below the first bridge part 22a, the first bridge part 22b, and the complementary electrode 4, which are between the detection electrode parts 31 adjacent to each other in the column direction.

The first bridge part 22a and the first bridge part 22b may be driven separately or driven together.

FIG. 9(a) is a cross-sectional view of the touch panel 10' along the section line A-A' shown in FIG. 8. FIG. 9(b) is a cross-sectional view of the touch panel 10' along the section line B-B' shown in FIG. 8. FIG. 9(c) is a cross-sectional view of the touch panel 10' along the section line C-C' shown in FIG. 8.

Parasitic capacitances Cfs, Cfo, Ccr, and Ccm_cr respectively shown in FIGS. 9(a) to 9(c) are the same as described in Embodiment 1.

In other words, the configuration is such that when applying the drive signal to the driver electrodes 2, a complementary signal at a different phase from the drive signal is applied to the complementary electrodes 4, and the amplitude ($\Delta Vcm$) of the complementary signal satisfies the following formula:

$$\Delta Vcm = -\Delta Vdr \times (Cfo + Ccr)/Ccm$$

and the complementary signal with the amplitude ($\Delta Vcm$) is applied to the complementary electrode 4.

Thus, as in Embodiment 1, a highly reliable touch panel in which glitches such as non-detection do not occur is attained.

The touch panel 10' of the present embodiment can also be installed on a display device, as in Embodiment 1.

Embodiment 3

Another embodiment according to the present invention is as described below with reference to FIGS. 10 and 11. In the present embodiment, differences from Embodiment 1 above will be described, and for ease of explanation, components having the same functions as those described in Embodiment 1 are given the same reference characters, and the descriptions thereof are omitted.

The difference between the touch panel of Embodiment 1 and the touch panel of the present embodiment is only that the position of the electrodes is different. Thus, only the position of the electrodes will be described below.

Figure 10:
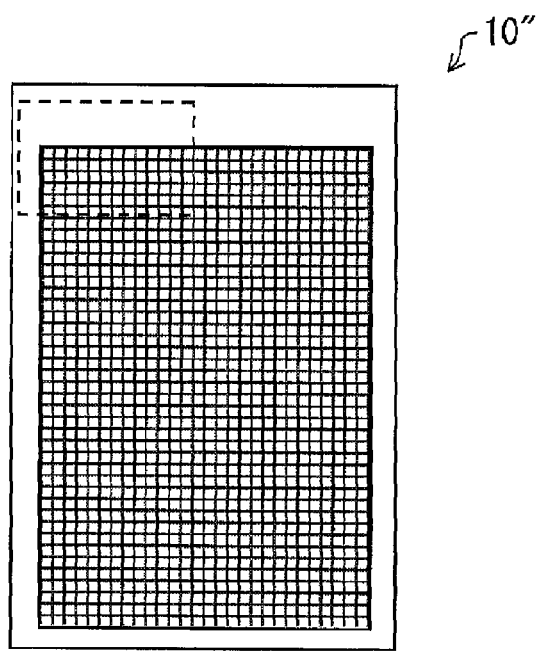
FIG. 10 shows a configuration of a touch panel according to another embodiment of the present invention.
Figure 10:
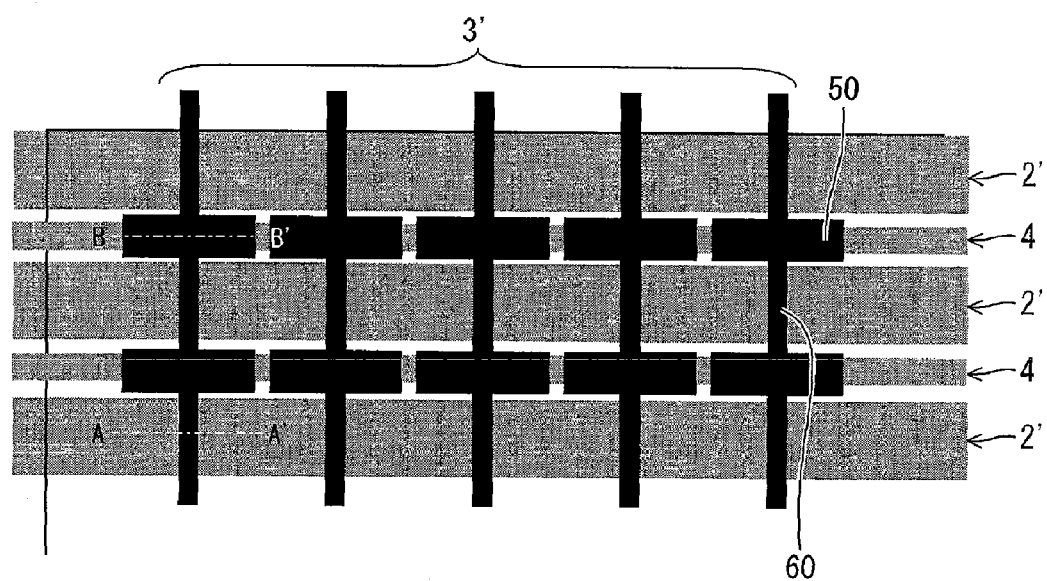
Figure 11:
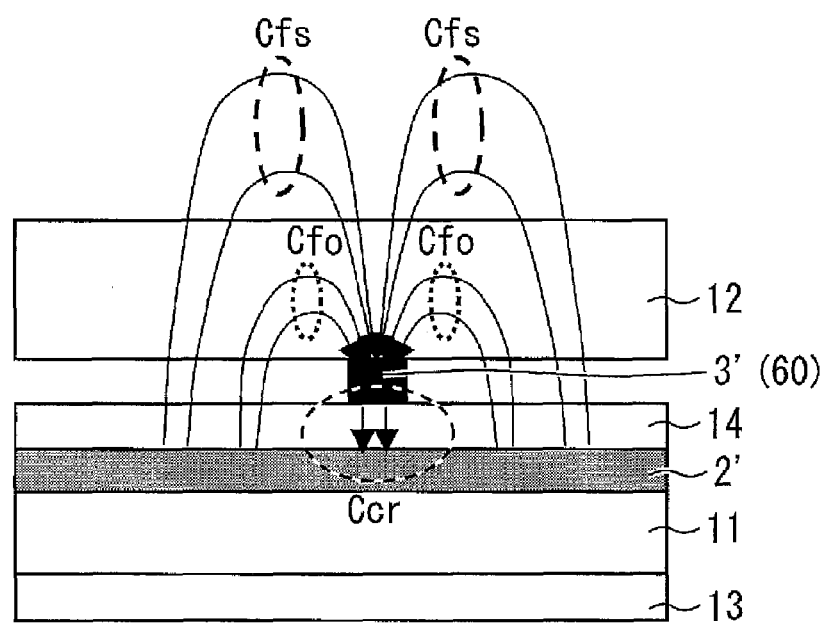
FIG. 11 shows cross-sectional views of the touch panel region shown in FIG. 10.
Figure 11:
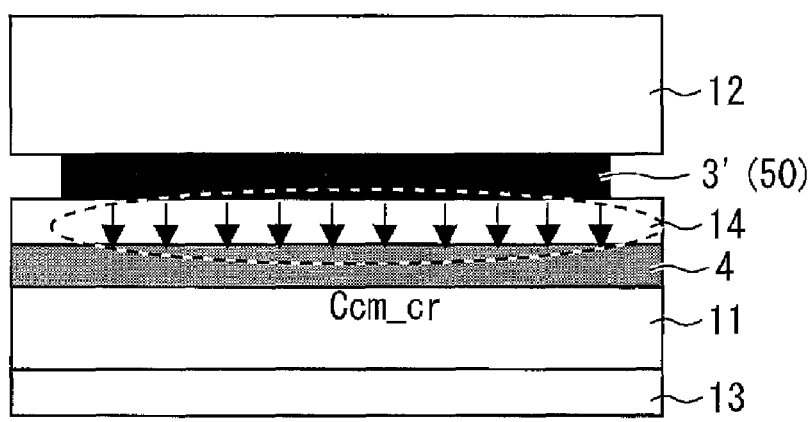

FIG. 10 shows a touch panel 10'' of the present embodiment. FIG. 10(a) is a top view of the touch panel corresponding to FIG. 1(a), and FIG. 10(b) is a partial magnified view of a touch panel region corresponding to FIG. 1(b).

In the touch panel region of the present embodiment, as shown in FIG. 10(b), driver electrodes 2' extend in the row direction and complementary electrodes 4 also extend in the row direction, and the driver electrodes 2' and the complementary electrodes 4 are aligned in an alternating fashion in the column direction, in the same layer as each other.

The driver electrodes 2' are not constituted of the driver electrode parts and the first bridge parts unlike Embodiment 1, but have an electrode line shape. Complementary electrodes 4 are the same as in Embodiment 1 and have an electrode line shape.

As shown in FIG. 10(b), the detection electrodes 3' extend in the column direction and intersect with the driver electrodes 2' and the complementary electrodes 4. As shown in FIG. 10(b), only the detection electrodes 3' are black. In other words, the detection electrodes 3' are closer to the detection surface than the driver electrodes 2' and the complementary electrodes 4.

The detection electrodes 3' have intersections 50 with the complementary electrodes 4 that are wider in the row direction than intersections 60 with the driver electrodes 2'. With this configuration, the detection electrodes are made wider on the complementary electrodes, and block lines of electric force from the lower layer outside, thereby minimizing the capacitance component between the complementary electrodes and the detection electrodes being affected by the object to be detected.

FIG. 11(a) is a cross-sectional view of the touch panel 10" along the line A-A' shown in FIG. 10. FIG. 11(b) is a cross-sectional view of the touch panel 10" along the line B-B' shown in FIG. 10.

Parasitic capacitances Cfs, Cfo, Ccr, and Ccm_cr respectively shown in FIGS. 11(a) and 11(b) are the same as those described in Embodiment 1.

In other words, the configuration is such that when applying the drive signal to the driver electrodes 2, a complementary signal at a different phase from the drive signal is applied to the complementary electrodes 4, and the amplitude ($\Delta Vcm$) of the complementary signal satisfies the following formula:

$$\Delta Vcm = -\Delta Vdr \times (Cfo + Ccr)/Ccm,$$

and the complementary signal with the amplitude ($\Delta Vcm$) is applied to the complementary electrode 4.

Thus, as in Embodiment 1, a highly reliable touch panel in which glitches such as non-detection do not occur is attained.

The touch panel 10" of the present embodiment can also be installed on a display device, as in Embodiment 1.

In the touch panel 10" of the present embodiment, the shape of overlap of the complementary electrodes and the detection electrodes is different from the shape of overlap of the driver electrodes and the detection electrodes. According to this, among the capacitance between the detection electrode and the driver electrode and between the detection electrode and the complementary electrode, the cross capacitance is not easily affected by the state of the detection surface, or in other words, whether or not an object to be detected as come into contact (approached), compared to the fringe capacitance. This allows an optimal capacitance value (Ccm) to be attained at the complementary electrode for minimizing the inactive charge induced on the detection electrode by the driver electrode, and is suited to minimizing the parasitic capacitance component in the detection electrode that is affected by an object to be detected. Thus, by having different shapes for overlapping portions, a more suitable complementary driving can be performed.

Embodiment 4

Figure 12:
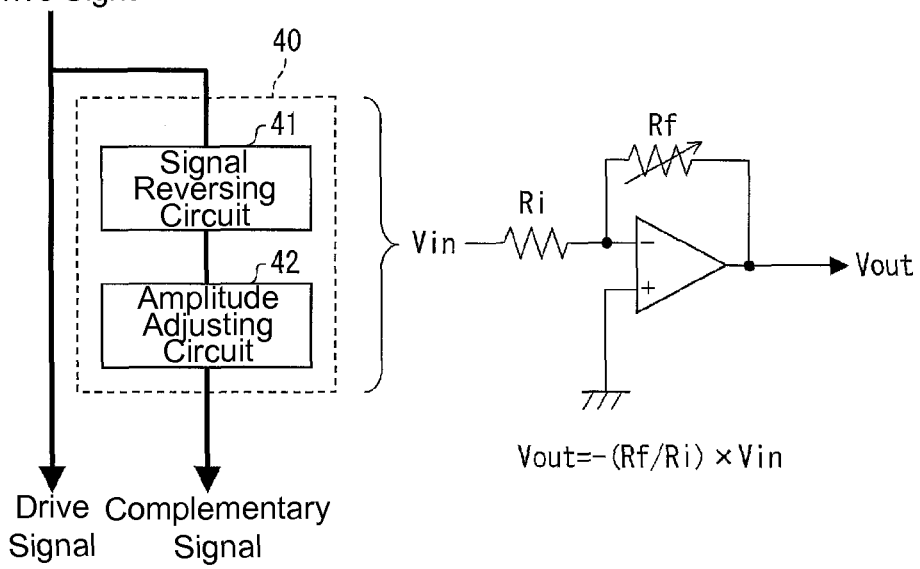
FIG. 12 shows a portion of a configuration of a touch panel according to another embodiment of the present invention.
Figure 12:
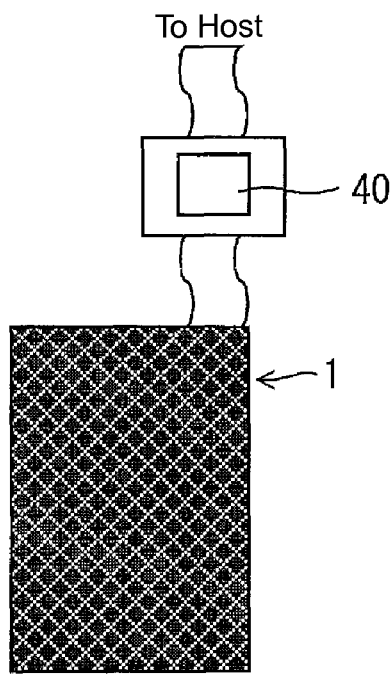

Another embodiment according to the present invention is as described below with reference to FIG. 12. In the present embodiment, differences from Embodiment 1 above will be described, and for ease of explanation, components having the same functions as those described in Embodiment 1 are given the same reference characters, and the descriptions thereof are omitted.

In Embodiment 1 above, a complementary signal generating circuit to which a drive signal is to be inputted generates a complementary signal. The present embodiment, in addition to this, has an amplitude adjusting circuit that adjusts amplitude. This will be explained with reference to FIG. 12.

FIG. 12(a) is a drawing for describing a complementary signal generating mechanism in the present embodiment, and FIG. 12(b) schematically shows the entire touch panel of the present embodiment.

As shown in FIG. 12(a), in the present embodiment, a reversed signal resulting from a drive signal being inputted into the signal reversing circuit 41 of the complementary signal generating mechanism 40 and being reversed therein is inputted into the amplitude adjusting circuit 42. As an example of the complementary signal generating mechanism 40, a circuit using a reversal amplifier shown on the right side of FIG. 12(a) can be installed.

By providing such an amplitude adjusting circuit 42, even if a change is made that affects the parasitic capacitance component in the device, such as the shape of various electrodes and the layered structure in the panel, the same circuit can be used with appropriate conditions.

An appropriate complementary signal is generated by the amplitude adjusting circuit 42, and this generated complementary signal is applied to the complementary electrode 4 in the touch panel region (FIG. 1, for example).

The present invention is not limited to the embodiments above. Various modifications can be made to the present invention by those skilled in the art without departing from the scope specified by claims. That is, new embodiments can be obtained by combining technologies that were appropriately modified in the scope specified by claims. That is, the specific embodiments provided in the detailed description of the present invention section are merely for illustration of the technical contents of the present invention. The present invention shall not be narrowly interpreted by being limited to such specific examples. Various changes can be made within the spirit of the present invention and the scope as defined by the appended claims.

SUMMARY OF INVENTION

As stated above, a touch panel according to the present invention is a touch panel that detects contact or approach of an object to a detection surface, including a detection electrode and a driver electrode, in which the touch panel detects the contact or approach of the object on the basis of a change in amount of an electric charge that is induced on the detection electrode in response to a drive signal applied to the driver electrode, and in which the touch panel further includes a complementary electrode that forms a capacitance along with the detection electrode, the complementary electrode having applied thereto a complementary signal having a different phase than the drive signal, a voltage change $\Delta Vcm$ of the complementary signal satisfying a formula below:

$$\Delta Vcm = -\Delta Vdr \times (Cfo + Ccr)/Ccm$$

where, in the formula, $\Delta Vdr$ represents a voltage change of the drive signal, Cfo represents a capacitance that is primarily a fringe capacitance between the driver electrode and the detection electrode corresponding to a capacitance component that is not affected by the object, Ccr represents a capacitance that is primarily a cross capacitance between the driver electrode and the detection electrode corresponding to a capacitance component that is not affected by the object, Cfo+Ccr represents a total capacitance between the driver electrode and the detection electrode that is not affected by a presence or absence of the object, and Ccm represents a capacitance formed between the complementary electrode and the detection electrode.

According to the configuration above, by providing a complementary electrode, it is possible to form between the complementary electrode and the detection electrode a parasitic capacitance corresponding to a capacitance component that does not affect detection, among the parasitic capacitance formed between the driver electrode and the detection electrode.

Specifically, (Cfo+Ccr) in the formula above represents a parasitic capacitance (Cfo) corresponding to a capacitance component that is not affected by an object to be detected among fringe capacitance between the driver electrode and the detection electrode being added to a parasitic capacitance (Ccr) corresponding to a capacitance component that is not affected by an object to be detected among cross capacitance between the driver electrode and the detection electrode. By multiplying this by (−ΔVdr), the resulting value corresponds to inactive charge that is generated regardless of whether or not an object to be detected is in contact or approaches the detection surface, and thus, by dividing this value by the parasitic capacitance (Ccm) formed between the complementary electrode and the detection electrode, it is possible to calculate the amplitude (ΔVcm) of the complementary signal. At the time of detection, by applying the complementary signal having this amplitude (ΔVcm) to the complementary electrode, of the charge induced on the detection electrode, the charge that is not affected by the object to be detected, or in other words, the inactive charge can be minimized.

Also, even if objects to be detected are in contact with (approach) the detection surface on the same line, the electrical changes do not cancel each other out unlike the conventional configuration. Thus, glitches such as non-detection do not occur.

Therefore, according to the configuration of the present invention, it is possible to provide a highly reliable touch panel in which glitches such as non-detection do not occur.

Fringe capacitance refers to capacitance formed between electrodes in the same layer, while cross capacitance refers to capacitance formed between electrodes in different layers from each other.

In addition to the configuration above, in the touch panel according to the present invention, it is preferable that the complementary electrodes and the driver electrodes have different shapes.

According to this configuration, the complementary electrodes and the driver electrodes have different shapes, and thus, it is possible to independently use optimal shapes to form the parasitic capacitance component necessary for each of the electrodes. For example, it is possible for the complementary electrodes to have a shape that can attain an optimal capacitance value (Ccm) for minimizing the inactive charge induced by the driver electrode on the detection electrode and that can minimize the parasitic capacitance component of the detection electrode being affected by the object to be detected, and it is possible for the driver electrodes to have a shape by which it is possible to maximize the parasitic capacitance component that is affected by the object to be detected.

As for the "different shape," the electrodes may have different widths.

In addition to the configuration above, it is preferable that the touch panel of the present invention include a complementary signal generating circuit that generates the complementary signal when the drive signal is inputted thereto.

According to this configuration, an appropriate complementary signal can be applied to the complementary electrode based on the drive signal.

In addition to the configuration above, it is preferable that the touch panel of the present invention include an adjusting circuit that adjusts an amplitude of the complementary signal when the complementary signal is inputted thereto.

According to this configuration, by providing an adjusting circuit that adjusts the amplitude of the complementary signal, it is possible to use the same circuits with appropriate conditions even if changes that affect the parasitic capacitance components in the device such as the shape of the various electrodes and the layered structure inside the panel are made.

In addition to the configuration above, in the touch panel according to the present invention, it is preferable that a plurality of the driver electrodes extend along a row direction, and a plurality of the detection electrodes extend along the column direction so as to intersect with the driver electrodes, that the complementary electrodes extend along an extension direction of the driver electrodes, and that a shape of overlap between the complementary electrodes and the detection electrodes differ from a shape of overlap between the driver electrodes and the detection electrodes.

According to this configuration, among the capacitance between the detection electrode and the driver electrode and complementary electrode, the cross capacitance is not easily affected by the state of the detection surface, or in other words, whether or not an object to be detected as come into contact (approached), compared to the fringe capacitance. This allows an optimal capacitance value (Ccm) to be attained at the complementary electrode for minimizing the inactive charge induced on the detection electrode by the driver electrode, and is suited to minimizing the parasitic capacitance component in the detection electrode that is affected by an object to be detected. Thus, by having different shapes for overlapping portions, a more suitable complementary driving can be performed.

In addition to the configuration above, in the touch panel of the present invention it is preferable that the driver electrodes include a plurality of driver electrode parts interconnected by first bridge parts, that the detection electrodes include a plurality of detection electrode parts interconnected by second bridge parts, that the driver electrode parts and the detection electrode parts be in the same layer as each other, and that either of the first bridge parts or the second bridge parts be in the same layer as the driver electrode parts and the detection electrode parts, with the other of the first bridge parts and the second bridge parts being in a layer different from the layer, and the complementary electrodes, at a portion thereof overlapping the detection electrodes, are in the same layer as whichever of the first bridge parts or the second bridge parts is in the layer different from driver electrode parts and the detection electrode parts.

According to this configuration, by forming the driver electrode parts and the detection electrode parts in the same layer, it is possible to efficiently form a capacitance component that is affected by the object to be detected, while by including the complementary electrodes in a different layer from the driver electrode parts and the detection electrode parts, it is possible to minimize the capacitance component that is affected by the object to be detected between the complementary electrodes and the detection electrodes. As in FIG. 1(b), the complementary electrodes are disposed in a layer below the driver electrode parts and the detection electrode parts, and the driver electrode parts and the detection electrode parts widely cover the complementary electrodes, and thus, it is possible to effectively mitigate the occurrence of lines of electric force, which is shown in FIG. 3(a) with Cfs, that signify the capacitance component that is affected by the object to be detected, between the complementary electrodes and the detection electrodes.

In addition to the configuration above, in the touch panel of the present invention it is preferable that the driver electrodes include a plurality of driver electrode parts interconnected by first bridge parts, that the detection electrodes include a plurality of detection electrode parts interconnected by second bridge parts, that the driver electrode parts, the first bridge parts, and the detection electrode parts be in the same layer, the second bridge parts being in a layer different from the driver electrode parts and the detection electrode parts, the complementary electrodes, at a portion thereof overlapping the detection electrodes, being in the same layer as the first bridge parts, that the detection electrode parts be aligned along the column direction, that the driver electrode parts be between detection electrode parts adjacent to each other in the row direction, and that the complementary electrodes extend between driver electrodes adjacent to each other in the column direction.

According to this configuration, even if it is necessary to dispose the complementary electrodes in the same layer as the driver electrode parts and the detection electrode parts, it is possible to avoid having the complementary electrodes and the detection electrodes be adjacent to each other, and thus, it is possible to reduce the capacitance component indicated with Cfs in FIG. 9(a), for example, and as a result, it is possible to minimize the capacitance component that is affected by an object to be detected among the capacitance between the complementary electrodes and the detection electrodes.

In addition to the configuration above, in the touch panel of the present invention it is preferable that the driver electrodes and the complementary electrodes be arranged in the same layer in an alternating fashion in the column direction, that the detection electrodes be in a layer different from the driver electrodes and the complementary electrodes, and that the detection electrodes be wider in the row direction at intersections thereof with the complementary electrodes, than at intersections thereof with the driver electrodes.

According to this configuration, it is not necessary to form a bridge part, thereby resulting in a relatively simple configuration.

Also, according to the configuration above, the capacitance component that is affected by the object to be detected among the capacitance between the driver electrodes and the detection electrodes is a portion of Cfs shown in FIG. 11(a), for example, or in other words, the component resulting from the lines of electric force that move towards the detection electrodes in a higher layer than the detection electrodes from the lower layer outside. Similarly, with respect to the complementary electrodes disposed in a lower layer, if the detection electrodes in a higher layer have the same shape as the driver electrodes, similar lines of electric force are generated, and thus, parasitic capacitance that is affected by the object to be detected is present (if the width of the driver electrodes and the complementary electrodes are different, then the Cfs is correspondingly different). A method to improve this is shown in FIG. 10(b) in which the detection electrodes are made wider on the complementary electrodes, and block the lines of electric force from the lower layer outside, thereby minimizing the capacitance component between the complementary electrodes and the detection electrodes being affected by the object to be detected.

The present invention also includes a display device provided with the above-mentioned touch panel.

INDUSTRIAL APPLICABILITY

The present invention can be used for a display device of various types of electronic devices as a display device in which a liquid crystal panel having a display function is combined with a touch panel function.

DESCRIPTION OF REFERENCE CHARACTERS 1 touch panel region
2 driver electrode
3 detection electrode
4 complementary electrode
10, 10', 10" touch panel
11 substrate
12 protective plate
13 shield
14 insulating film
21 driver electrode part
22, 22a, 22b first bridge part
31 detection electrode part
32 second bridge part
40 complementary signal generating mechanism
41 signal reversing circuit
42 amplitude adjusting circuit
50 intersection
60 intersection
70 liquid crystal display part
71 first polarizing plate
72 display driver
73 second polarizing plate
74 first substrate
75 second substrate
80 touch panel part
81 type of electrode
82 detection driver
90 liquid crystal display device
170 liquid crystal display device
171 display region
172 frame
173 driver
174 flexible substrate
175 pixel
180 pixel electrode
181 common electrode
182 auxiliary capacitance wiring line
183 switching element

The invention claimed is:
1. A touch panel that detects contact or approach of an object to a detection surface, comprising a detection electrode and a driver electrode, wherein the touch panel detects the contact or approach of the object on the basis of a change in amount of an electric charge that is induced on the detection electrode in response to a drive signal applied to the driver electrode, and wherein the touch panel further comprises a complementary electrode that forms a capacitance along with the detection electrode, the complementary electrode having applied thereto a complementary signal having a different phase than the drive signal, a voltage change ΔVcm of the complementary signal satisfying a formula below:

$$\Delta Vcm = -\Delta Vdr \times (Cfo + Ccr)/Ccm$$

where, in said formula, ΔVdr represents a voltage change of the drive signal, Cfo represents a capacitance that is primarily a fringe capacitance between the driver electrode and the detection electrode corresponding to a capacitance component that is not affected by the object, Ccr represents a capacitance that is primarily a cross capacitance between the driver electrode and the detection electrode corresponding to a capacitance component that is not affected by the object, Cfo+Ccr represents a total capacitance between the driver electrode and the detection electrode that is not affected by a presence or absence of the object, and Ccm represents a capacitance formed between the complementary electrode and the detection electrode.

2. The touch panel according to claim 1, wherein the complementary electrode and the driver electrode have different shapes.

3. The touch panel according to claim 1, further comprising a complementary signal generating circuit that generates the complementary signal when the drive signal is inputted thereto.

4. The touch panel according to claim 1, further comprising an adjusting circuit that adjusts the voltage change of the complementary signal when the complementary signal is inputted thereto.

5. The touch panel according to claim 1,
wherein a plurality of said driver electrodes extend along a row direction, and a plurality of said detection electrodes extend along the column direction so as to intersect with the driver electrodes,
wherein the complementary electrode extends along an extension direction of the driver electrodes, and
wherein a shape of overlap between the complementary electrode and the detection electrodes differs from a shape of overlap between the driver electrodes and the detection electrodes.

6. The touch panel according to claim 5,
wherein the driver electrodes include a plurality of driver electrode parts interconnected by first bridge parts,
wherein the detection electrodes include a plurality of detection electrode parts interconnected by second bridge parts,
wherein the driver electrode parts and the detection electrode parts are in the same layer as each other, and
wherein either of the first bridge parts or the second bridge parts is in the same layer as the driver electrode parts and the detection electrode parts, with the other of the first bridge parts and the second bridge parts being in a layer different from said layer, and the complementary electrode, at a portion thereof overlapping the detection electrodes, is in the same layer as whichever of the first bridge parts or the second bridge parts is in the layer different from driver electrode parts and the detection electrode parts.

7. The touch panel according to claim 5,
wherein the driver electrodes include a plurality of driver electrode parts interconnected by first bridge parts,
wherein the detection electrodes include a plurality of detection electrode parts interconnected by second bridge parts,
wherein the driver electrode parts, the first bridge parts, and the detection electrode parts are in the same layer, the second bridge parts being in a layer different from the driver electrode parts and the detection electrode parts, the complementary electrode, at a portion thereof overlapping the detection electrodes, being in the same layer as the first bridge parts,
wherein the detection electrode parts are aligned along the column direction,
wherein the driver electrode parts are between detection electrode parts adjacent to each other in the row direction, and
wherein the complementary electrode extends between driver electrodes adjacent to each other in the column direction.

8. The touch panel according to claim 5,
wherein the driver electrodes and the complementary electrode are arranged in the same layer in an alternating fashion in the column direction,
wherein the detection electrodes are in a layer different from the driver electrodes and the complementary electrode, and
wherein the detection electrodes are wider in the row direction at intersections thereof with the complementary electrode, than at intersections thereof with the driver electrodes.

9. A display device, comprising the touch panel according to claim 1.

* * * * *